United States Patent [19]

Orbach et al.

[11] Patent Number: 5,128,601
[45] Date of Patent: Jul. 7, 1992

[54] PULSED LASER SYSTEM

[75] Inventors: Zvi Orbach, Haifa; Zeev Ganor, Herzlia; Ofer Hareuveni, Kiryat Yam; Miguel O. Simerman, Haifa, all of Israel

[73] Assignee: Elron Electronic Industries Ltd., Haifa, Israel

[21] Appl. No.: 558,796

[22] Filed: Jul. 27, 1990

[30] Foreign Application Priority Data

Aug. 7, 1989 [IL] Israel ......................................... 91240

[51] Int. Cl.$^5$ ............................................. H01S 3/13
[52] U.S. Cl. .......................................... 372/30; 372/25
[58] Field of Search .............................. 372/29, 25, 30

[56] References Cited

U.S. PATENT DOCUMENTS 4,972,210  11/1990  Woo ..................................... 372/29

OTHER PUBLICATIONS

W. Koechner, Solid State Laser Engineering, Springer-Verlag (N.Y. 1988, 2nd ed.) pp. 402–412.

Primary Examiner—James W. Davie
Attorney, Agent, or Firm—Poms, Smith, Lande & Rose

[57] ABSTRACT

Stabilized pulsed laser apparatus including pulsed laser means providing an output beam including a plurality of pulses, a pulse controller providing control instructions to the laser, and an attenuator for selectably performing attenuation of the output beam of the pulsed laser means in response to at least the time interval between a given pulse and the pulse preceding it, for maintaining at least one desired energy characteristic notwithstanding changes in at least the time interval.

30 Claims, 12 Drawing Sheets

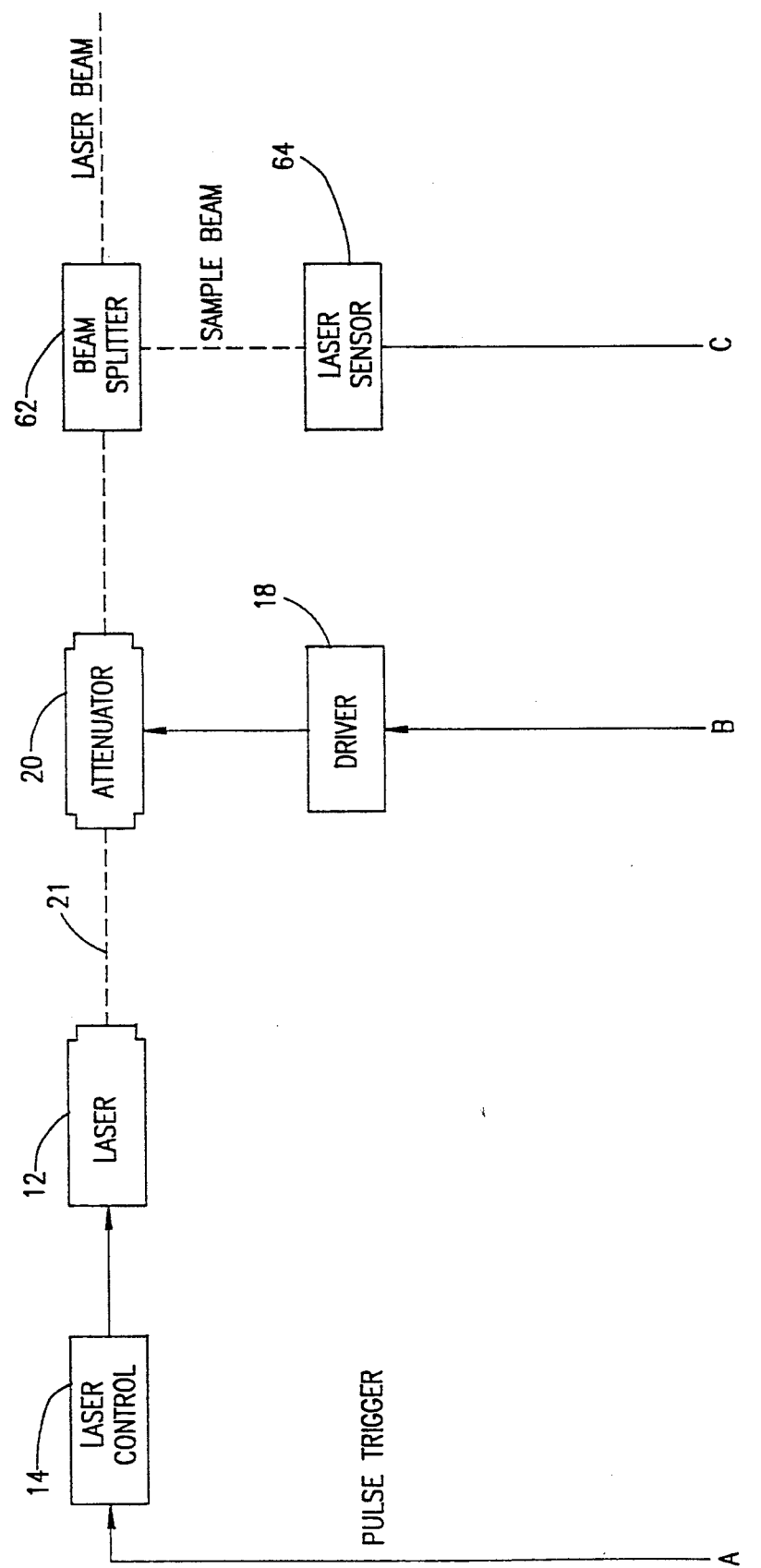

2 OF 2

1 OF 2

5,128,601

PULSED LASER SYSTEM

FIELD OF THE INVENTION

The present invention relates to solid state laser systems generally and more particularly to pulsed lasers.

BACKGROUND OF THE INVENTION

Solid state lasers are operated normally in continuous wave (CW), Q-switched, single pulse, or repetitively triggered operation. It is known to stabilize the output of a continuous wave (CW) laser by employing an acousto-optic attenuator responsive to the intensity of the laser beam as measured by a photodetector.

When a pulsed laser is operated with asynchronous triggering at relatively high pulse rates, i.e. at rates exceeding its electronic relaxation rate, the energy content, peak power, pulse width and pulse build up time vary as a function of the time separation between successive pulses, producing uneven operation of the laser.

SUMMARY OF THE INVENTION

The present invention seeks to provide a stabilized pulsed laser system which provides uniform output characteristics even at high pulse rates.

There is thus provided in accordance with a preferred embodiment of the present invention stabilized pulsed laser apparatus including pulsed laser means providing an output beam including a plurality of pulses, a pulse controller providing control instructions to the laser, and an attenuator for selectably performing attenuation of the output beam of the pulsed laser means in response to at least the time interval between a given pulse and the pulse preceding it, for maintaining at least one desired energy characteristic notwithstanding changes in at least the time interval.

Further in accordance with a preferred embodiment of the present invention, the apparatus also includes means for computation of the attenuation according to the time interval between a present pulse and each of a plurality of previous pulses.

There is also provided in accordance with a further embodiment of the present invention a technique for operation of pulsed laser apparatus, the laser apparatus defining a population inversion build up time thereof, the technique including the steps of operating the pulsed laser apparatus to provide an output beam including a plurality of output pulses having non-equal time intervals therebetween, at least some of the non-equal time intervals being less than the population inversion build up time, and attenuating the output beam of the pulsed laser apparatus in response to at least the elapsed time interval between a given pulse and the pulse preceding it, for maintaining desired energy characteristics notwithstanding changes in the elapsed time interval.

Further in accordance with a preferred embodiment of the present invention, the technique also includes, prior to the step of attenuating, the step of computing the attenuation according to the time interval between a present pulse and each of a plurality of previous pulses.

There is also provided, in accordance with yet a further embodiment of the present invention, stabilized pulsed laser apparatus including pulsed laser means providing an output beam including a plurality of pulses, a pulse controller providing control instructions to the pulsed laser means, an attenuator for selectably attenuating the output beam of the pulsed laser means in response to attenuation control signals; and generating means for generating attenuation control signals in response to an indication of an energy characteristic of the preceding pulse and to the time interval between a given pulse and the pulse preceding it, for maintaining at least one desired energy characteristic notwithstanding changes in the time interval.

Further in accordance with a preferred embodiment of the present invention, the stabilized pulsed laser apparatus also includes sampling means for sampling the output beam, sensing the at least one energy characteristic thereof, and providing an indication of the at least one energy characteristic thereof to the generating means.

Still further in accordance with a preferred embodiment of the present invention, the sampling means includes a beam splitter and energy characteristic sensing means.

Additionally in accordance with a preferred embodiment of the present invention, the energy characteristic sensing means includes a photodetector.

Still further in accordance with a preferred embodiment of the present invention, the beam splitter is located along the path of the output beam between the laser and the attenuator. Alternatively, the attenuator is located along the path of the output beam between the laser and the beam splitter.

According to yet a further preferred embodiment of the present invention there is provided a technique for calibration of pulsed laser stabilizing apparatus defining a population inversion build-up time, the technique including the steps of operating the pulsed laser to provide a plurality of output pulses having non-equal time intervals therebetween, at least some of the non-equal time intervals being less than the population inversion build up time, and generating a look-up table based on empirically derived data, the look up table providing an indication of an energy characteristic of a present pulse based on the time interval between the present pulse and the pulse preceding it and on the basis of an energy characteristic of the preceding pulse.

Still further in accordance with a preferred embodiment of the present invention, the step of operating includes the step of operating the pulsed laser to provide a relatively large number of equally spaced pulses.

Further in accordance with a preferred embodiment of the present invention, the generating means includes a look-up table based on empirically derived data providing an indication of an energy characteristic of a present pulse based on at least the time interval between the present pulse and the pulse preceding it. According to a further embodiment of the present invention, there is provided a method of producing pulsed non-periodic coherent energy outputs including the steps of providing a Q-switched laser having at least two selectable pumping rates, and governing the pumping such that a given degree of population inversion is reached for each pulse, irrespective of the time interval separating it from the preceding pulse.

Further in accordance with a preferred embodiment of the present invention, the governing step includes the step of setting the degree of population inversion to be equal to that realized for pulses produced at the minimum possible interval between successive pulses.

Still further in accordance with a preferred embodiment of the present invention, the governing step includes the step of receiving indications of the triggering of each pulse and selecting a one of the at least two pumping rates upon receipt of each of the indications.

Additionally in accordance with a preferred embodiment of the present invention, the selecting step includes the step of providing maximum rate pumping for a time duration equal to the minimum duration between adjacent pulses.

Further in accordance with a preferred embodiment of the present invention, the step of providing maximum rate pumping begins immediately after each pulse.

Still further in accordance with a preferred embodiment of the present invention, the step of providing maximum rate pumping begins a predetermined length of time before the pulse.

Additionally in accordance with a preferred embodiment of the present invention, the governing step includes the step of providing continuous pumping at a low rate to compensate for natural decay.

Further in accordance with a preferred embodiment of the present invention, the step of providing continuous pumping takes place when the rate of pumping is less than the maximum rate of pumping. still further in accordance with a preferred embodiment of the present invention, one of the at least two selectable pumping rates is the zero pumping rate.

According to yet another preferred embodiment of the present invention there is provided apparatus for producing pulsed non-periodic coherent energy outputs including a Q-switched laser having at least two selectable pumping rates and governing means for governing the pumping such that a given degree of population inversion is reached for each pulse, irrespective of the time interval separating it from the preceding pulse.

Further in accordance with a preferred embodiment of the present invention, the Q-switched laser includes a solid state pumped laser, which may be an Nd:YLF or an Nd:YAG.

Still further in accordance with a preferred embodiment of the present invention, the solid state pumped laser is pumped by a solid state laser diode.

Additionally in accordance with a preferred embodiment of the present invention, the at least one energy characteristic includes at least one of the following characteristics: pulse energy content, pulse peak power, pulse average power, pulse intensity, pulse peak intensity.

Still further in accordance with a preferred embodiment of the present invention, the apparatus also includes timing means for sensing the time interval between subsequent pulses and providing an indication thereof to the generating means.

Additionally in accordance with a preferred embodiment of the present invention, the attenuator includes an acousto-optic attenuator.

Further in accordance of a preferred embodiment of the present invention, the indication of the energy characteristic is also based on an energy characteristic of the preceding pulse.

It is noted that the term "inversion build up time" and the like as they appear herein refer to the time separation between pulses required to bring the laser rod population inversion rate to a level which is close enough, in terms of the resolution required in a particular application, to saturation level (i.e., to the maximum population inversion level of the specific laser configuration).

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
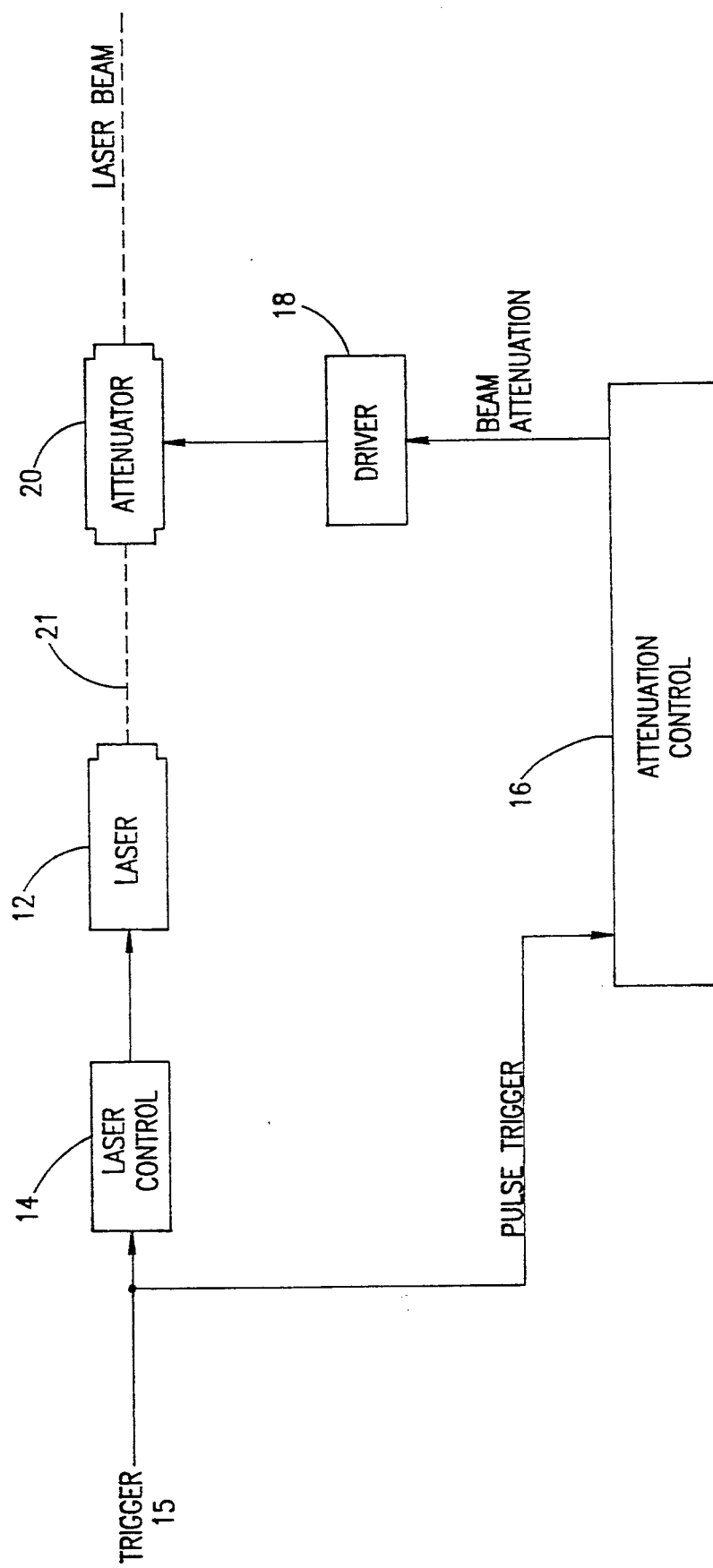
FIG. 1 is a block diagram illustration of pulse laser stabilization apparatus constructed and operative in accordance with a preferred embodiment of the present invention.

Reference is now made to FIG. 1 which illustrates in simplified block diagram form stabilized pulsed laser apparatus constructed and operative in accordance with a preferred embodiment of the present invention and including a pulsed laser 12 such as a 532 F-O/QS-2, available from Quantronix Corp., Smithtown, NY, USA, which is operated by laser control apparatus 14 such as a Quantronix model 331. The laser control apparatus 14 is operative to cause the pulsed laser 12 to provide an output laser beam, comprising laser pulses, in response to pulse trigger signals from a trigger source 15.

An attenuation controller 16 is operative to provide, in response to pulse trigger signals from trigger source 15, an attenuation control signal to an attenuator driver 18, such as an IntraAction Model E502, available from IntracAction Corp., Bellwood, IL, USA. Driver 18 is operative to govern the attenuation produced by an attenuator 20, such as an IntraAction Model AFM-50, which lies along the output path 21 of the laser beam.

It is a particular feature of this embodiment that the attenuator 20 is operative to attenuate the laser output pulses in response to the time intervals between a given pulse and at least the pulse preceding it (preferably a plurality of the pulses preceding it) for maintaining desired pulse energy notwithstanding changes in the time interval.

It is noted that the apparatus of the present invention is operative to provided "real time" attenuation of the laser output pulses by taking advantage of the delay, caused by the pulse build up time of approximately three microseconds, between the arrival of the trigger at the laser and the resulting pulse emission therefrom.

When the time interval between two successive laser pulses is not sufficient to guarantee that the population inversion rate reaches saturation, two parameters will determine the pulse energy of the later pulse:

The first is the residual population inversion ($n_f$) at the end of the previous pulse.

The second is the time interval between the pulses (t).

The theory of solid state Q-switched lasers can be found in several books such as *Solid-State Laser Engineering* by W. Kohechner, Springer Series of Optical Sciences, Springer-Verlag, 1976.

A photo detector, such as a PIN photodiode, may be used to measure the actual energy of the last pulse. Such measurement significantly simplifies the computation required to predict the following pulse energy. Alternatively, the relationships set forth hereinbelow can be used to calculate the pulse energy. From the teaching of W. Kohechner, the following exact relationship 8.7 and approximate relationship 8.8 are known:

$$n_f - n_i = n_t \ln(n_f/n_i) \quad \quad 8.7$$

$$E = (gamma)^{-1} V^* h(nu) (n_i - n_f) \ln(1/R)/[\ln(1/R) + L] \quad \quad 8.8$$

where

E = the energy of a pulse $n_i$ = the initial population inversion $n_f$ = the final population inversion (residual) at the termination of the pulse gamma, $n_t$, $V^*$, h, nu, R, L = constants and laser parameters.

Relationships 8.7 and 8.8 imply that, if the previous pulse energy E is known, the value of the current $n_f$ can be determined. Once $n_f$ is known, the energy of the next pulse can be predicted by substituting:

$$n_i = n(t) = n_{inf} - (n_{inf} - n_f) \exp(-t/tau_f), \quad \quad 8.14$$

where t = the time interval between the two pulses $n_{inf}$, $tau_f$ = parameters, for $n_i$ in (8.7) and (8.8).

Obtaining the mathematical solution requires relatively lengthy computation which can, however, be greatly simplified by using numerical approximations. Alternatively, one can use experimental results obtained in the course of an adaptation or learning process to generate a two dimensional look-up table. The learning process is thought to give more accurate results since the experimental results of the learning process are based upon the actual values of the apparatus parameters, obtained in real time, rather than the nominal values thereof. In contrast, use of the mathematical model may not accurately reflect the behavior of certain components of the apparatus. For example, a frequency doubler in the laser may cause a nonlinear transformation of the pulse energy.

The two inputs to the table generated by the learning process would be the previous pulse energy E and the time period to the next pulse t. The output from the look-up table would be the expected energy of the next pulse. Once the expected energy of the next pulse is known, the attenuator can be set accordingly to compensate such that the laser pulses will maintain a generally uniform energy level.

In accordance with this preferred embodiment of the invention, the above functional relationship is expressed in a two-dimensional look up table which is constructed based on empirical learning data. Such a look up table may be of the type illustrated in FIG. 2, for example, and may be generated in the following manner: For each pulse repetition rate, the output energy is stabilized by providing a sufficient number of equally spaced pulses. Usually, after about 100 pulses, the output energy is stable. The energy of each pulse is then measured, thereby providing a value for the first input to the table (previous pulse energy). A further pulse is generated after a time t and its energy is measured. The pulse repetition rates and the elapsed times t are varied to fill up the look up table.

If desired, such as when it is desired to construct the table within a relatively short time period, the number of equally spaced pulses provided before the energy is measured may be decreased considerably. However, if only an extremely small number of equally spaced pulses (such as 3–4 pulses) is provided, the resulting prediction table may be somewhat inaccurate.

The advantages of the above procedure are:

1) accuracy, since the look-up table is empirically derived by carrying out measurements on the actual laser to be compensated and thus is based upon the actual values of the laser parameters rather than the theoretically expected values thereof.

2) rapid calculation since, in today's electronics, look-up tables are relatively economical.

As stated, once the energy of the expected pulse is determined, the necessary attenuation is set to ensure that the attenuated pulse maintains a predetermined, uniform energy level.

Figure 3:
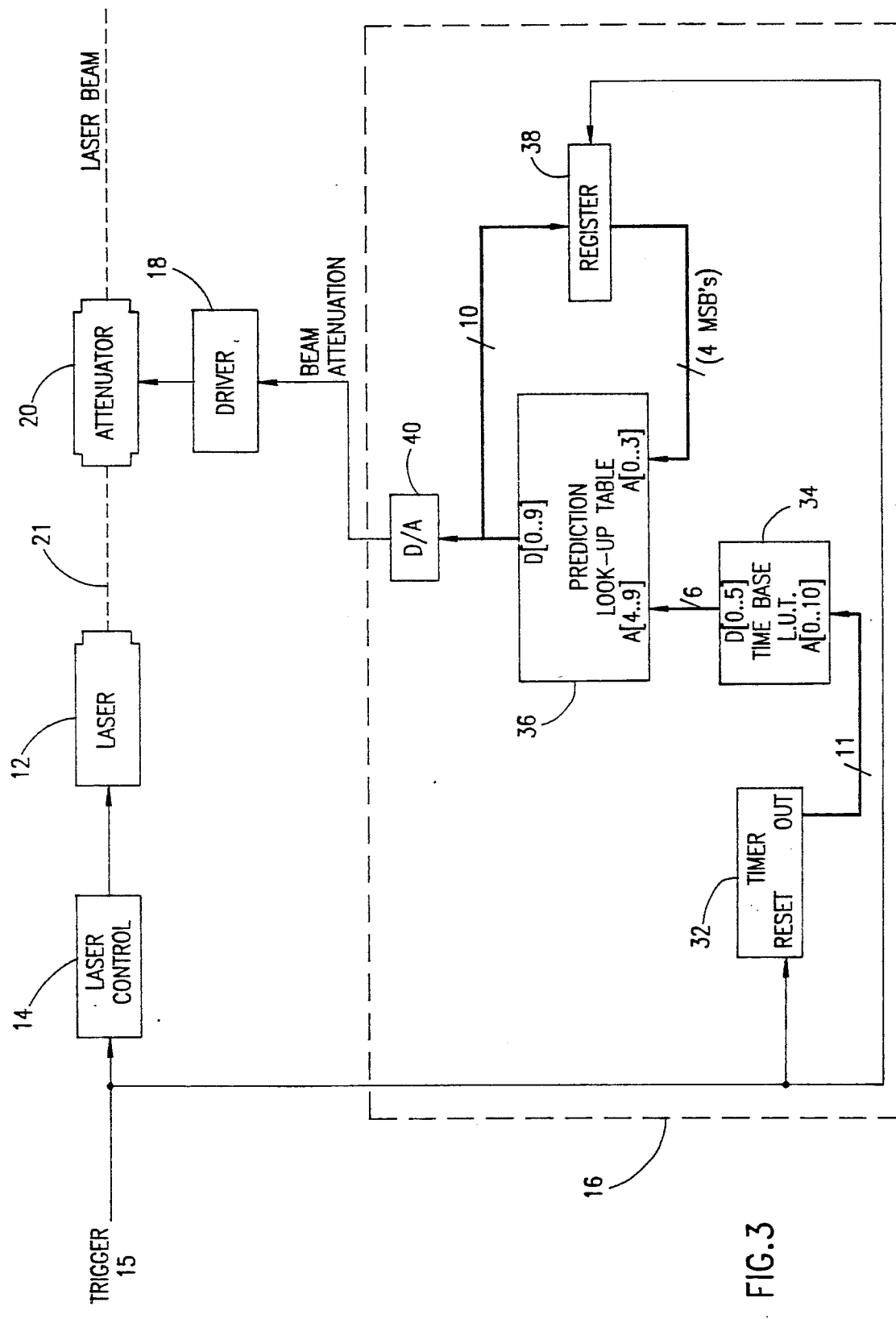
FIG. 3 is a detailed block diagram illustration of the apparatus of FIG. 1.

Reference is now made to FIG. 3, which illustrates the details of a possible implementation of the pulse and attenuation controller 16 shown in FIG. 1. According to this embodiment, the controller 16 comprises a timer 32 which receives a trigger from trigger source 15 and outputs to a prediction look-up table 36, preferably via a time-base look-up table 34, and then to a a D/A converter 40, such as a DAC 10FX, available from PMI-Precision Monolithics Inc., Santa Clara, CA. At least a portion of the address for the table 36 is a function of the previous pulse, and generally comprises at least some of the bits of the attenuation value selected for the previous pulse. This information is stored in a register 38, as explained in detail hereinbelow.

The trigger source 15 is operative to provide trigger signals according to the requirements of the application. The timer 32 is typically a count up 11 bits counter with a resolution of approximately 1 microsecond. Timer 32 resets to zero when it receives an indication from trigger source 15 that the laser is triggered, and is stacked at full-scale when the maximum count is exceeded, and until the succeeding laser trigger. This counter value determines the address entry to time-base look-up table 34, if provided, which in turn determines, in the shown embodiment, the 6 most significant bits of the address to prediction look-up-table 36, which, in the shown embodiment, is a 10-bit address. Alternatively, the 6 bits may be least significant bits and/or more or less than 6 bits may be determined by the counter value. Still another alternative is that the counter value of timer 32 may directly determine a portion of the address in table 36.

Table 34 is preferably constructed so as to decrease the size of the prediction look-up table 36 without significantly decreasing the resolution of the prediction. The shown construction of table 34 allows table 36 to be constructed according to a preferred embodiment, whereby the prediction values vary generally homogeneously between addresses within any given 6 most significant bit range.

A typical time-base table 34 is shown in Table I. The time-base table is preferably generated according to the population increase (charge) function of the laser rod between pulses, which function is generally exponential. More specifically, once the population increase function of the laser rod has been estimated or directly measured, the intervals in the left-hand column are chosen such that the population increases generally homogeneously between intervals and increase hardly at all within intervals. This procedure generally results in intervals of non-uniform length, as seen in Table I. The length of the final intervals is due to the laser rod having reached its saturation point.

TABLE I

| ADDRESS RANGE | DATA |
|---|---|
| 0 TO 164 | 0 |
| 165 TO 166 | 1 |
| 167 TO 169 | 2 |
| 170 TO 173 | 3 |
| 174 TO 177 | 4 |
| 178 TO 181 | 5 |
| 182 TO 185 | 6 |
| 186 TO 189 | 7 |
| 190 TO 193 | 8 |
| 194 TO 197 | 9 |
| 198 TO 202 | 10 |
| 203 TO 206 | 11 |
| 207 TO 210 | 12 |
| 211 TO 215 | 13 |
| 216 TO 220 | 14 |
| 221 TO 224 | 15 |
| 225 TO 229 | 16 |
| 230 TO 234 | 17 |
| 235 TO 239 | 18 |
| 240 TO 244 | 19 |
| 245 TO 250 | 20 |
| 251 TO 255 | 21 |
| 256 TO 261 | 22 |
| 262 TO 266 | 23 |
| 267 TO 272 | 24 |
| 273 TO 278 | 25 |
| 279 TO 284 | 26 |
| 285 TO 290 | 27 |
| 291 TO 297 | 28 |
| 298 TO 304 | 29 |
| 305 TO 310 | 30 |
| 311 TO 318 | 31 |
| 319 TO 325 | 32 |
| 326 TO 332 | 33 |
| 333 TO 340 | 34 |
| 341 TO 348 | 35 |
| 349 TO 357 | 36 |
| 358 TO 365 | 37 |
| 366 TO 374 | 38 |
| 375 TO 384 | 39 |
| 385 TO 393 | 40 |
| 394 TO 404 | 41 |
| 405 TO 414 | 42 |
| 415 TO 426 | 43 |
| 427 TO 437 | 44 |
| 438 TO 450 | 45 |
| 451 TO 463 | 46 |
| 464 TO 477 | 47 |
| 478 TO 492 | 48 |
| 493 TO 507 | 49 |
| 508 TO 525 | 50 |
| 526 TO 543 | 51 |

TABLE I-continued

| ADDRESS RANGE | DATA |
|---|---|
| 544 TO 563 | 52 |
| 564 TO 585 | 53 |
| 586 TO 609 | 54 |
| 610 TO 636 | 55 |
| 637 TO 667 | 56 |
| 668 TO 702 | 57 |
| 703 TO 744 | 58 |
| 745 TO 795 | 59 |
| 796 TO 861 | 60 |
| 862 TO 953 | 61 |
| 954 TO 1110 | 62 |
| 1111 TO 2047 | 63 |

A typical prediction look-up table 36 is shown in Table II. For each address in the left-hand columns, there is provided in the right-hand columns a digital value representing the attenuation of the incoming pulse required to maintain stable pulse energy. As stated hereinabove, the most significant bits of the address for the look-up table are determined by the time separation between pulses. The least significant bits of this address, typically 4 out of the 10 bits, are the 4 most significant bits of the 10-bit attenuation value determined for the previous pulse and stored in register 38, since the attenuation of the preceding pulse is indicative of the energy thereof. Upon system initialization, register 38 is loaded to the data value located at the highest address of the prediction look-up table, e.g. to the value located at address 1023 for the 10 bit address prediction look-up table of the present example.

TABLE II

| ADDRESS | DATA | ADDRESS | DATA | ADDRESS | DATA |
|---|---|---|---|---|---|
| 0 | 334 | 344 | 261 | 688 | 219 |
| 1 | 327 | 345 | 257 | 689 | 217 |
| 2 | 324 | 346 | 255 | 690 | 215 |
| 3 | 320 | 347 | 253 | 691 | 214 |
| 4 | 320 | 348 | 250 | 692 | 214 |
| 5 | 313 | 349 | 250 | 693 | 212 |
| 6 | 308 | 350 | 247 | 694 | 211 |
| 7 | 306 | 351 | 246 | 695 | 211 |
| 8 | 306 | 352 | 244 | 696 | 209 |
| 9 | 301 | 353 | 241 | 697 | 208 |
| 10 | 297 | 354 | 241 | 698 | 207 |
| 11 | 293 | 355 | 239 | 699 | 203 |
| 12 | 293 | 356 | 236 | 700 | 203 |
| 13 | 288 | 357 | 234 | 701 | 202 |
| 14 | 288 | 358 | 233 | 702 | 201 |
| 15 | 285 | 359 | 233 | 703 | 201 |
| 16 | 279 | 360 | 230 | 704 | 325 |
| 17 | 278 | 361 | 228 | 705 | 323 |
| 18 | 276 | 362 | 226 | 706 | 322 |
| 19 | 275 | 363 | 226 | 707 | 317 |
| 20 | 273 | 364 | 224 | 708 | 314 |
| 21 | 269 | 365 | 223 | 709 | 310 |
| 22 | 267 | 366 | 223 | 710 | 306 |
| 23 | 264 | 367 | 221 | 711 | 302 |
| 24 | 262 | 368 | 219 | 712 | 301 |
| 25 | 257 | 369 | 217 | 713 | 297 |
| 26 | 255 | 370 | 216 | 714 | 295 |
| 27 | 255 | 371 | 215 | 715 | 291 |
| 28 | 253 | 372 | 214 | 716 | 291 |
| 29 | 253 | 373 | 212 | 717 | 287 |
| 30 | 252 | 374 | 211 | 718 | 282 |
| 31 | 247 | 375 | 211 | 719 | 282 |
| 32 | 245 | 376 | 209 | 720 | 278 |
| 33 | 242 | 377 | 208 | 721 | 276 |
| 34 | 241 | 378 | 207 | 722 | 274 |
| 35 | 240 | 379 | 204 | 723 | 272 |
| 36 | 237 | 380 | 203 | 724 | 269 |
| 37 | 236 | 381 | 202 | 725 | 269 |
| 38 | 234 | 382 | 201 | 726 | 261 |
| 39 | 234 | 383 | 201 | 727 | 261 |
| 40 | 231 | 384 | 329 | 728 | 258 |
| 41 | 230 | 385 | 325 | 729 | 257 |

TABLE II-continued

| ADDRESS | DATA | ADDRESS | DATA | ADDRESS | DATA | ADDRESS | DATA | ADDRESS | DATA | ADDRESS | DATA |
|---|---|---|---|---|---|---|---|---|---|---|---|
| 42 | 228 | 386 | 322 | 730 | 254 | 123 | 204 | 467 | 272 | 811 | 226 |
| 43 | 226 | 387 | 319 | 731 | 253 | 124 | 203 | 468 | 271 | 812 | 224 |
| 44 | 224 | 388 | 314 | 732 | 250 | 125 | 202 | 469 | 269 | 813 | 223 |
| 45 | 223 | 389 | 313 | 733 | 249 | 126 | 202 | 470 | 264 | 814 | 221 |
| 46 | 223 | 390 | 308 | 734 | 247 | 127 | 201 | 471 | 262 | 815 | 221 |
| 47 | 223 | 391 | 303 | 735 | 244 | 128 | 331 | 472 | 260 | 816 | 219 |
| 48 | 219 | 392 | 303 | 736 | 242 | 129 | 325 | 473 | 257 | 817 | 217 |
| 49 | 219 | 393 | 299 | 737 | 241 | 130 | 322 | 474 | 255 | 818 | 215 |
| 50 | 216 | 394 | 297 | 738 | 240 | 131 | 319 | 475 | 253 | 819 | 214 |
| 51 | 215 | 395 | 293 | 739 | 237 | 132 | 317 | 476 | 250 | 820 | 214 |
| 52 | 214 | 396 | 292 | 740 | 236 | 133 | 313 | 477 | 250 | 821 | 212 |
| 53 | 214 | 397 | 287 | 741 | 234 | 134 | 308 | 478 | 247 | 822 | 211 |
| 54 | 212 | 398 | 284 | 742 | 233 | 135 | 306 | 479 | 245 | 823 | 210 |
| 55 | 211 | 399 | 282 | 743 | 233 | 136 | 305 | 480 | 244 | 824 | 209 |
| 56 | 210 | 400 | 278 | 744 | 229 | 137 | 300 | 481 | 241 | 825 | 208 |
| 57 | 209 | 401 | 276 | 745 | 228 | 138 | 297 | 482 | 241 | 826 | 207 |
| 58 | 208 | 402 | 274 | 746 | 226 | 139 | 293 | 483 | 239 | 827 | 203 |
| 59 | 208 | 403 | 273 | 747 | 226 | 140 | 293 | 484 | 236 | 828 | 203 |
| 60 | 207 | 404 | 271 | 748 | 224 | 141 | 288 | 485 | 234 | 829 | 202 |
| 61 | 203 | 405 | 269 | 749 | 223 | 142 | 287 | 486 | 233 | 830 | 201 |
| 62 | 202 | 406 | 264 | 750 | 221 | 143 | 284 | 487 | 233 | 831 | 201 |
| 63 | 201 | 407 | 262 | 751 | 221 | 144 | 278 | 488 | 230 | 832 | 325 |
| 64 | 333 | 408 | 260 | 752 | 219 | 145 | 278 | 489 | 228 | 833 | 322 |
| 65 | 326 | 409 | 257 | 753 | 217 | 146 | 276 | 490 | 226 | 834 | 320 |
| 66 | 322 | 410 | 255 | 754 | 215 | 147 | 275 | 491 | 226 | 835 | 317 |
| 67 | 320 | 411 | 253 | 755 | 214 | 148 | 272 | 492 | 224 | 836 | 314 |
| 68 | 317 | 412 | 250 | 756 | 214 | 149 | 269 | 493 | 223 | 837 | 310 |
| 69 | 313 | 413 | 250 | 757 | 212 | 150 | 267 | 494 | 223 | 838 | 306 |
| 70 | 308 | 414 | 247 | 758 | 211 | 151 | 263 | 495 | 221 | 839 | 302 |
| 71 | 306 | 415 | 246 | 759 | 211 | 152 | 262 | 496 | 219 | 840 | 300 |
| 72 | 305 | 416 | 244 | 760 | 209 | 153 | 257 | 497 | 217 | 841 | 297 |
| 73 | 300 | 417 | 241 | 761 | 208 | 154 | 255 | 498 | 215 | 842 | 294 |
| 74 | 297 | 418 | 241 | 762 | 207 | 155 | 254 | 499 | 215 | 843 | 291 |
| 75 | 293 | 419 | 239 | 763 | 203 | 156 | 252 | 500 | 214 | 844 | 291 |
| 76 | 293 | 420 | 236 | 764 | 203 | 157 | 250 | 501 | 212 | 845 | 287 |
| 77 | 288 | 421 | 234 | 765 | 202 | 158 | 247 | 502 | 211 | 846 | 282 |
| 78 | 287 | 422 | 233 | 766 | 201 | 159 | 246 | 503 | 211 | 847 | 282 |
| 79 | 284 | 423 | 233 | 767 | 201 | 160 | 245 | 504 | 209 | 848 | 276 |
| 80 | 279 | 424 | 230 | 768 | 325 | 161 | 242 | 505 | 208 | 849 | 275 |
| 81 | 278 | 425 | 228 | 769 | 322 | 162 | 241 | 506 | 207 | 850 | 273 |
| 82 | 276 | 426 | 226 | 770 | 322 | 163 | 239 | 507 | 203 | 851 | 272 |
| 83 | 275 | 427 | 226 | 770 | 317 | 164 | 237 | 508 | 203 | 852 | 269 |
| 84 | 272 | 428 | 224 | 772 | 314 | 165 | 234 | 509 | 202 | 853 | 269 |
| 85 | 269 | 429 | 223 | 773 | 310 | 166 | 233 | 510 | 201 | 854 | 263 |
| 86 | 267 | 430 | 223 | 774 | 306 | 167 | 233 | 511 | 201 | 855 | 261 |
| 87 | 263 | 431 | 221 | 775 | 302 | 168 | 230 | 512 | 326 | 856 | 258 |
| 88 | 262 | 432 | 219 | 776 | 301 | 169 | 230 | 513 | 324 | 857 | 257 |
| 89 | 257 | 433 | 217 | 777 | 297 | 170 | 227 | 514 | 322 | 858 | 254 |
| 90 | 255 | 434 | 216 | 778 | 295 | 171 | 226 | 515 | 317 | 859 | 253 |
| 91 | 254 | 435 | 215 | 779 | 291 | 172 | 224 | 516 | 314 | 860 | 250 |
| 92 | 252 | 436 | 214 | 780 | 291 | 173 | 223 | 517 | 313 | 861 | 249 |
| 93 | 250 | 437 | 212 | 781 | 287 | 174 | 223 | 518 | 308 | 862 | 246 |
| 94 | 249 | 438 | 211 | 782 | 282 | 175 | 223 | 519 | 303 | 863 | 244 |
| 95 | 247 | 439 | 211 | 783 | 282 | 176 | 219 | 520 | 303 | 864 | 242 |
| 96 | 245 | 440 | 209 | 784 | 278 | 177 | 219 | 521 | 298 | 865 | 241 |
| 97 | 242 | 441 | 208 | 785 | 276 | 178 | 216 | 522 | 295 | 866 | 240 |
| 98 | 241 | 442 | 207 | 786 | 274 | 179 | 215 | 523 | 293 | 867 | 237 |
| 99 | 240 | 443 | 204 | 787 | 272 | 180 | 214 | 524 | 291 | 868 | 236 |
| 100 | 237 | 444 | 203 | 788 | 269 | 181 | 212 | 525 | 287 | 869 | 234 |
| 101 | 236 | 445 | 202 | 789 | 269 | 182 | 211 | 526 | 282 | 870 | 232 |
| 102 | 234 | 446 | 201 | 790 | 263 | 183 | 211 | 527 | 282 | 871 | 230 |
| 103 | 234 | 447 | 201 | 791 | 261 | 184 | 210 | 528 | 278 | 872 | 229 |
| 104 | 230 | 448 | 326 | 792 | 258 | 185 | 209 | 529 | 276 | 873 | 228 |
| 105 | 230 | 449 | 324 | 793 | 257 | 186 | 208 | 530 | 274 | 874 | 226 |
| 106 | 228 | 450 | 322 | 794 | 254 | 187 | 204 | 531 | 272 | 875 | 226 |
| 107 | 226 | 451 | 317 | 795 | 253 | 188 | 203 | 532 | 269 | 876 | 224 |
| 108 | 224 | 452 | 314 | 796 | 250 | 189 | 202 | 533 | 269 | 877 | 223 |
| 109 | 223 | 453 | 313 | 797 | 249 | 190 | 202 | 534 | 264 | 878 | 221 |
| 110 | 223 | 454 | 308 | 798 | 247 | 191 | 201 | 535 | 261 | 879 | 221 |
| 111 | 223 | 455 | 303 | 799 | 244 | 192 | 329 | 536 | 259 | 880 | 219 |
| 112 | 219 | 456 | 303 | 800 | 242 | 193 | 325 | 537 | 257 | 881 | 217 |
| 113 | 219 | 457 | 298 | 801 | 241 | 194 | 322 | 538 | 255 | 882 | 215 |
| 114 | 216 | 458 | 295 | 802 | 240 | 195 | 319 | 539 | 253 | 883 | 214 |
| 115 | 215 | 459 | 293 | 803 | 237 | 196 | 317 | 540 | 250 | 884 | 214 |
| 116 | 214 | 460 | 292 | 804 | 236 | 197 | 313 | 541 | 249 | 885 | 212 |
| 117 | 212 | 461 | 287 | 805 | 234 | 198 | 308 | 542 | 247 | 886 | 211 |
| 118 | 211 | 462 | 282 | 806 | 232 | 199 | 303 | 543 | 244 | 887 | 210 |
| 119 | 211 | 463 | 282 | 807 | 230 | 200 | 303 | 544 | 243 | 888 | 209 |
| 120 | 210 | 464 | 278 | 808 | 229 | 201 | 300 | 545 | 241 | 889 | 208 |
| 121 | 209 | 465 | 276 | 809 | 228 | 202 | 297 | 546 | 241 | 890 | 207 |
| 122 | 208 | 466 | 274 | 810 | 226 | 203 | 293 | 547 | 237 | 891 | 203 |

TABLE II-continued

| ADDRESS | DATA | ADDRESS | DATA | ADDRESS | DATA |
|---|---|---|---|---|---|
| 204 | 293 | 548 | 236 | 892 | 203 |
| 205 | 288 | 549 | 234 | 893 | 202 |
| 206 | 285 | 550 | 233 | 894 | 201 |
| 207 | 284 | 551 | 233 | 895 | 201 |
| 208 | 278 | 552 | 229 | 896 | 325 |
| 209 | 278 | 553 | 228 | 897 | 322 |
| 210 | 276 | 554 | 226 | 898 | 317 |
| 211 | 275 | 555 | 224 | 899 | 317 |
| 212 | 272 | 556 | 223 | 900 | 314 |
| 213 | 269 | 557 | 221 | 901 | 308 |
| 214 | 264 | 558 | 221 | 902 | 305 |
| 215 | 263 | 559 | 221 | 903 | 302 |
| 216 | 262 | 560 | 219 | 904 | 300 |
| 217 | 257 | 561 | 217 | 905 | 297 |
| 218 | 255 | 562 | 215 | 906 | 294 |
| 219 | 254 | 563 | 214 | 907 | 291 |
| 220 | 252 | 564 | 214 | 908 | 291 |
| 221 | 250 | 565 | 212 | 909 | 287 |
| 222 | 247 | 566 | 211 | 910 | 282 |
| 223 | 246 | 567 | 211 | 911 | 282 |
| 224 | 245 | 568 | 209 | 912 | 276 |
| 225 | 241 | 569 | 208 | 913 | 275 |
| 226 | 241 | 570 | 207 | 914 | 273 |
| 227 | 239 | 571 | 203 | 915 | 272 |
| 228 | 237 | 572 | 203 | 916 | 269 |
| 229 | 234 | 573 | 202 | 917 | 269 |
| 230 | 233 | 574 | 201 | 918 | 263 |
| 231 | 233 | 575 | 201 | 919 | 259 |
| 232 | 230 | 576 | 325 | 920 | 258 |
| 233 | 230 | 577 | 323 | 921 | 257 |
| 234 | 227 | 578 | 322 | 922 | 253 |
| 235 | 226 | 579 | 317 | 923 | 253 |
| 236 | 224 | 580 | 314 | 924 | 250 |
| 237 | 223 | 581 | 313 | 925 | 249 |
| 238 | 223 | 582 | 306 | 926 | 246 |
| 239 | 221 | 583 | 303 | 927 | 242 |
| 240 | 219 | 584 | 301 | 928 | 242 |
| 241 | 217 | 585 | 298 | 929 | 241 |
| 242 | 216 | 586 | 295 | 930 | 239 |
| 243 | 215 | 587 | 291 | 931 | 237 |
| 244 | 214 | 588 | 291 | 932 | 236 |
| 245 | 212 | 589 | 287 | 933 | 234 |
| 246 | 211 | 590 | 282 | 934 | 232 |
| 247 | 211 | 591 | 282 | 935 | 230 |
| 248 | 210 | 592 | 278 | 936 | 229 |
| 249 | 209 | 593 | 276 | 937 | 228 |
| 250 | 208 | 594 | 274 | 938 | 226 |
| 251 | 204 | 595 | 272 | 939 | 224 |
| 252 | 203 | 596 | 269 | 940 | 224 |
| 253 | 202 | 597 | 269 | 941 | 223 |
| 254 | 202 | 598 | 264 | 942 | 221 |
| 255 | 201 | 599 | 261 | 943 | 221 |
| 256 | 329 | 600 | 258 | 944 | 217 |
| 257 | 325 | 601 | 257 | 945 | 217 |
| 258 | 322 | 602 | 254 | 946 | 215 |
| 259 | 319 | 603 | 253 | 947 | 214 |
| 260 | 316 | 604 | 250 | 948 | 214 |
| 261 | 313 | 605 | 249 | 949 | 211 |
| 262 | 308 | 606 | 247 | 950 | 211 |
| 263 | 303 | 607 | 244 | 951 | 210 |
| 264 | 303 | 608 | 243 | 952 | 209 |
| 265 | 300 | 609 | 241 | 953 | 208 |
| 266 | 297 | 610 | 241 | 954 | 207 |
| 267 | 293 | 611 | 237 | 955 | 203 |
| 268 | 292 | 612 | 236 | 956 | 203 |
| 269 | 288 | 613 | 234 | 957 | 202 |
| 270 | 284 | 614 | 233 | 958 | 201 |
| 271 | 282 | 615 | 233 | 959 | 201 |
| 272 | 278 | 616 | 229 | 960 | 325 |
| 273 | 278 | 617 | 228 | 961 | 320 |
| 274 | 275 | 618 | 226 | 962 | 317 |
| 275 | 273 | 619 | 226 | 963 | 314 |
| 276 | 271 | 620 | 224 | 964 | 312 |
| 277 | 269 | 621 | 223 | 965 | 308 |
| 278 | 264 | 622 | 221 | 966 | 305 |
| 279 | 263 | 623 | 221 | 967 | 301 |
| 280 | 261 | 624 | 219 | 968 | 296 |
| 281 | 257 | 625 | 217 | 969 | 295 |
| 282 | 255 | 626 | 215 | 970 | 293 |
| 283 | 254 | 627 | 214 | 971 | 291 |
| 284 | 252 | 628 | 214 | 972 | 287 |
| 285 | 250 | 629 | 212 | 973 | 285 |
| 286 | 247 | 630 | 211 | 974 | 282 |
| 287 | 246 | 631 | 211 | 975 | 280 |
| 288 | 244 | 632 | 209 | 976 | 276 |
| 289 | 241 | 633 | 208 | 977 | 275 |
| 290 | 241 | 634 | 207 | 978 | 273 |
| 291 | 239 | 635 | 203 | 979 | 272 |
| 292 | 237 | 636 | 203 | 980 | 269 |
| 293 | 234 | 637 | 202 | 981 | 267 |
| 294 | 233 | 638 | 201 | 982 | 261 |
| 295 | 233 | 639 | 201 | 983 | 258 |
| 296 | 230 | 640 | 325 | 984 | 258 |
| 297 | 228 | 641 | 323 | 985 | 257 |
| 298 | 227 | 642 | 322 | 986 | 253 |
| 299 | 226 | 643 | 317 | 987 | 253 |
| 300 | 224 | 644 | 314 | 988 | 250 |
| 301 | 223 | 645 | 313 | 989 | 249 |
| 302 | 223 | 646 | 306 | 990 | 244 |
| 303 | 221 | 647 | 303 | 991 | 242 |
| 304 | 219 | 648 | 301 | 992 | 241 |
| 305 | 217 | 649 | 297 | 993 | 241 |
| 306 | 216 | 650 | 295 | 994 | 238 |
| 307 | 215 | 651 | 291 | 995 | 236 |
| 308 | 214 | 652 | 291 | 996 | 236 |
| 309 | 212 | 653 | 287 | 997 | 232 |
| 310 | 211 | 654 | 282 | 998 | 231 |
| 311 | 211 | 655 | 282 | 999 | 230 |
| 312 | 209 | 656 | 378 | 1000 | 229 |
| 313 | 209 | 657 | 276 | 1001 | 228 |
| 314 | 208 | 658 | 274 | 1002 | 225 |
| 315 | 204 | 659 | 272 | 1003 | 224 |
| 316 | 203 | 660 | 269 | 1004 | 224 |
| 317 | 202 | 661 | 269 | 1005 | 223 |
| 318 | 201 | 662 | 264 | 1006 | 221 |
| 319 | 201 | 663 | 261 | 1007 | 221 |
| 320 | 329 | 664 | 258 | 1008 | 217 |
| 321 | 325 | 665 | 257 | 1009 | 216 |
| 322 | 322 | 666 | 254 | 1010 | 215 |
| 323 | 319 | 667 | 253 | 1011 | 214 |
| 324 | 314 | 668 | 250 | 1012 | 214 |
| 325 | 313 | 669 | 249 | 1013 | 211 |
| 326 | 308 | 670 | 247 | 1014 | 210 |
| 327 | 303 | 671 | 244 | 1015 | 210 |
| 328 | 303 | 672 | 243 | 1016 | 208 |
| 329 | 300 | 673 | 241 | 1017 | 208 |
| 330 | 297 | 674 | 241 | 1018 | 207 |
| 331 | 293 | 675 | 237 | 1019 | 202 |
| 332 | 292 | 676 | 236 | 1020 | 201 |
| 333 | 288 | 677 | 234 | 1021 | 201 |
| 334 | 284 | 678 | 233 | 1022 | 200 |
| 335 | 282 | 679 | 233 | 1023 | 200 |
| 336 | 278 | 680 | 229 | | |
| 337 | 276 | 681 | 228 | | |
| 338 | 275 | 682 | 226 | | |
| 339 | 273 | 683 | 226 | | |
| 340 | 271 | 684 | 224 | | |
| 341 | 269 | 685 | 223 | | |
| 342 | 264 | 686 | 221 | | |
| 343 | 263 | 687 | 221 | | |

The digital to analog converter 40, which may comprise any suitable D/A converter such as a DAC 10FX, available from PMI-Precision Monolithics Inc., Santa Clara, CA, USA, is operative to translate the digital value of attenuation received from look-up-table 36 to an analog voltage which is required for controlling the A/O driver 18.

Figure 2:
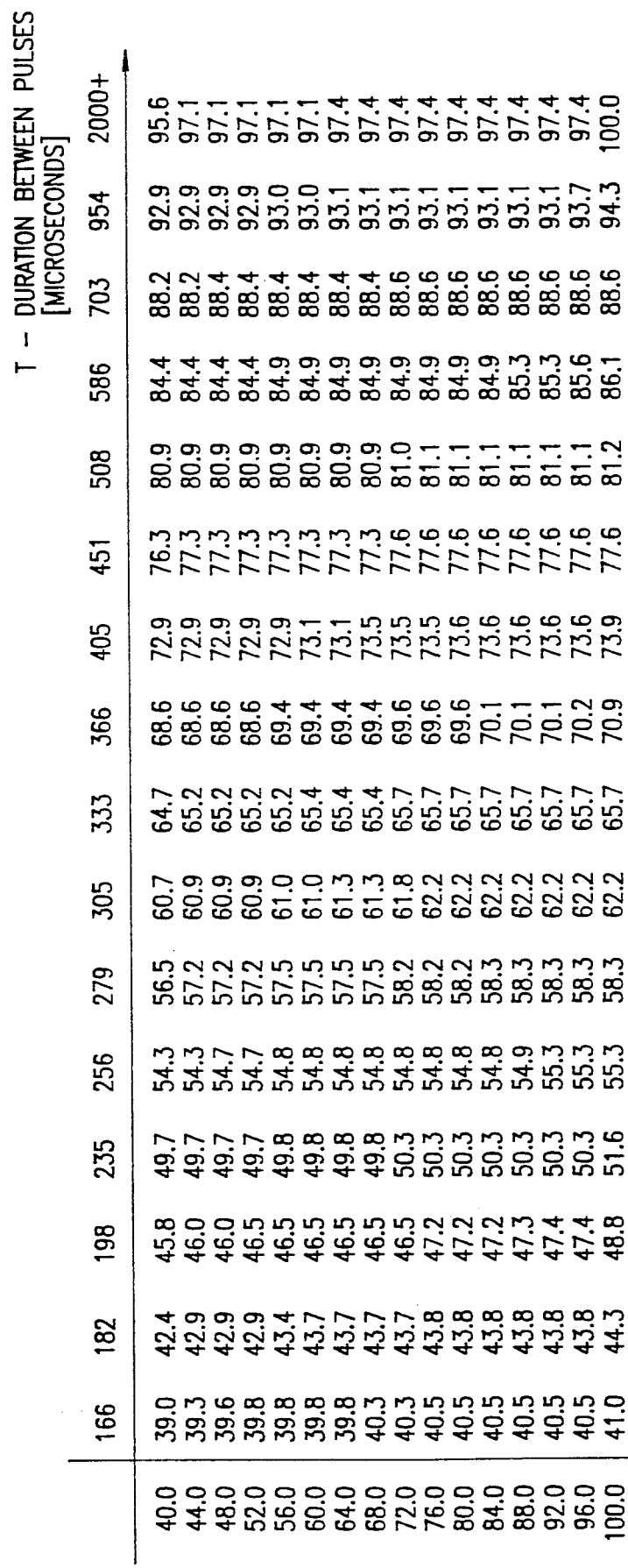
FIG. 2 is a look up table of a laser response learned as a function of the previous pulse energy and the time interval between each pulse and the pulse preceding it.

In the shown embodiment, 6 bits of the 10-bit address are a function of the time elapsed between pulses and 4 bits of the 10-bit address are a function of the previous pulse attenuation, since the second input is a less significant parameter than the first input, as seen in FIG. 2. However, the preferred number of bits used to represent each of the 2 inputs may vary depending on the laser used.

Figure 4A:
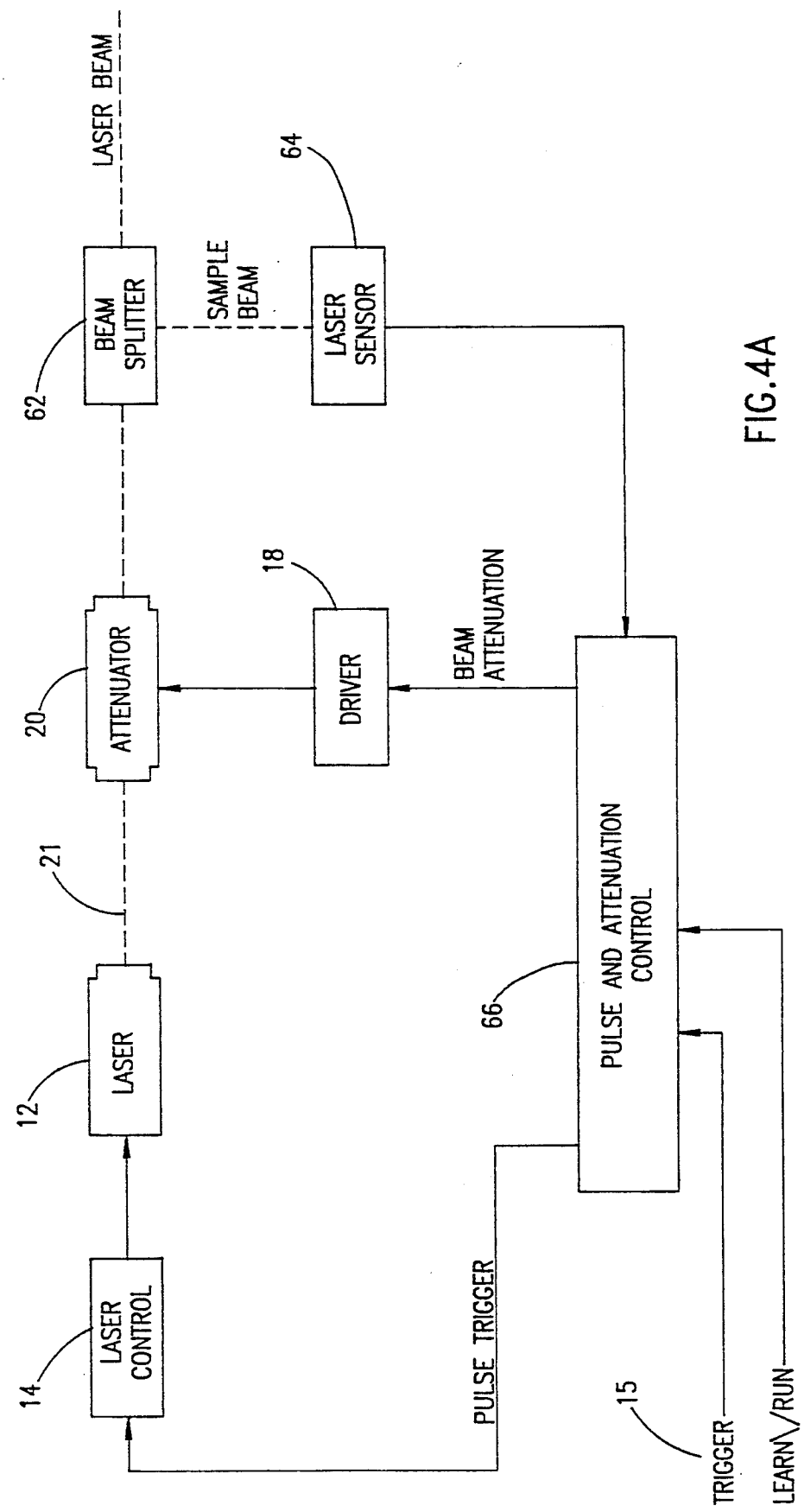
FIG. 4A is a block diagram illustration of a pulsed laser stabilization apparatus which includes an energy sensor for the learning of the laser response.
Figure 4B:
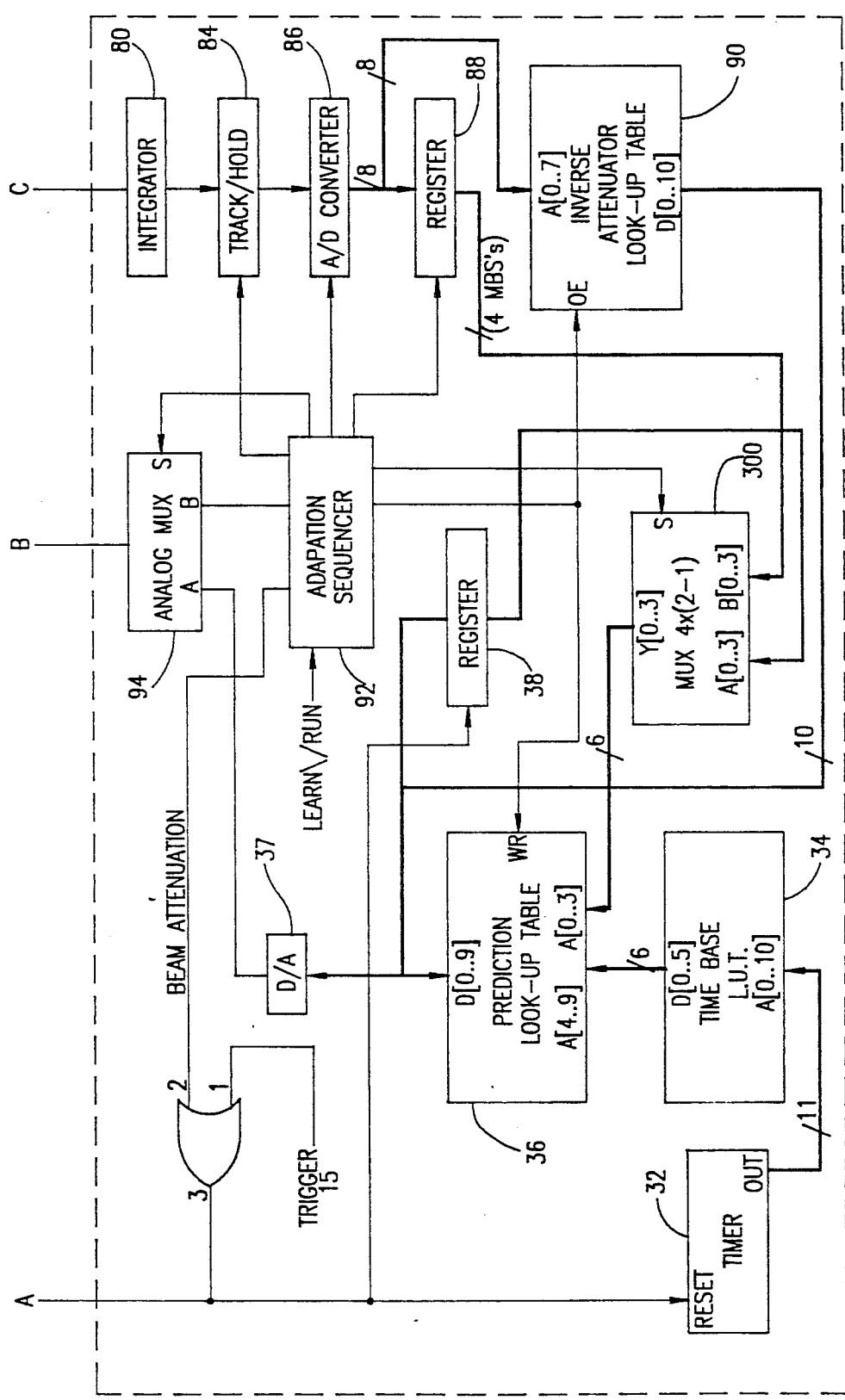
FIG. 4B is a detailed block diagram of the apparatus of FIG. 4B.

Reference is now made to FIGS. 4A and 4B, the structure of which is similar to the embodiment of FIG. 1, but also comprises a laser beam splitter 62 lying along the laser beam output path which directs a beam sample to a photo-electric sensor 64 (such as a PIN phtodiode). The apparatus of FIGS. 4A and 4B, when in a first, normal operation mode, operates similarly to the apparatus of FIG. 3. However, the apparatus of FIGS. 4A and 4B is also capable of assuming a second, adaptation or learning mode, useful for learning the actual response of the laser in order to create a suitable prediction look-up table 36. A two-position input device 100 enables a user to select either the learning mode or the normal operation mode.

In the shown embodiment, the splitter 62 and sensor 64 are only operative when the apparatus of FIG. 4B is in its second, adaptation mode. However, an alternative construction of the apparatus of FIGS. 4A and 4B may utilize the splitter and sensor in the course of normal operation of the apparatus of the present invention for correction of drifts and detection of ripple in the laser pulse energy which are beyond the specified working range of the attenuation apparatus.

FIG. 4B illustrates the details of an implementation of the pulse and attenuation controller 66 shown in FIG. 4A. In addition to the components that also appear in, and were described with reference to, FIG. 3, there are provided an integrator 80 which integrates current from laser sensor 64 to produce an output which is proportional to the sampled laser beam energy. A track/hold 84 and an analog to digital converter 86 convert the laser energy to a digital value which is stored in a register 88. Typically, the 4 most significant bits of the registered value for a pulse n are used as the entry for the previous pulse in constructing the entry for pulse n+1 in look-up table 36 during the adaptation stage.

Integrator 80 may be based on an amplifier such as the LH0032C, available from National Semiconductor Corp., Santa Clara, CA, USA. Track/hold 80 may be based on the AD583, available from Analog Devices, Norwood, MA, USA. A/D converter 86 may be, for example, the AD 7820 converter available from Analog Devices, Norwood, MA, USA. Each of registers 38 and 88 may comprise, for example, a 74LS175, available from Texas Instruments. The tables shown and described herein may be stored by any suitable means, such as in RAM, particularly for table 36 in FIGS. 4B and 5B, and in ROM.

Preferably, an inverse attenuator lookup table 90 is provided in which case the digital value of the sampled laser beam current pulse energy is also used as an entry to table 90, which in response puts on the data bus the attenuation value required in order to compensate for the deviation of the pulse energy from the desired level. An example of an inverse attenuator look-up table 90 is shown in table III. The timer 32, which counts the time interval between the current pulse and the pulse preceding it as in FIG. 3, provides the 6 most significant bits (typically) for entry to the look-up table 36, preferably after the transformation of the time base table as explained hereinabove in connection with FIG. 3. A sequencer 92 creates a suitable sequence of triggers for the adaptation process with systematically varied time-intervals therebetween, as explained hereinabove in connection with FIG. 2. Sequencer 92 may be implemented by any standard microcontroller with an internal programmable interval counter, such as an 8096 microcontroller, available from Texas Instruments. Sequencer 92 is also operative to coordinate the operations of track/hold 84, A/D converter 86, register 88, table 90, table 36, multiplexer 94 and an analog multiplexer 96, which elements are only operative in the learning mode.

TABLE III

| ADDRESS | DATA |
| --- | --- |
| 0 | 1023 |
| 1 | 1023 |
| 2 | 1023 |
| 3 | 1023 |
| 4 | 1023 |
| 5 | 1023 |
| 6 | 1023 |
| 7 | 1023 |
| 8 | 1023 |
| 9 | 1023 |
| 10 | 1023 |
| 11 | 1023 |
| 12 | 1023 |
| 13 | 1023 |
| 14 | 1023 |
| 15 | 1023 |
| 16 | 1023 |
| 17 | 1023 |
| 18 | 1023 |
| 19 | 1023 |
| 20 | 1023 |
| 21 | 1023 |
| 22 | 1023 |
| 23 | 1023 |
| 24 | 995 |
| 25 | 983 |
| 26 | 852 |
| 27 | 813 |
| 28 | 783 |
| 29 | 756 |
| 30 | 727 |
| 31 | 708 |
| 32 | 688 |
| 33 | 673 |
| 34 | 659 |
| 35 | 644 |
| 36 | 633 |
| 37 | 617 |
| 38 | 608 |
| 39 | 597 |
| 40 | 587 |
| 41 | 579 |
| 42 | 569 |
| 43 | 559 |
| 44 | 550 |
| 45 | 544 |
| 46 | 538 |
| 47 | 531 |
| 48 | 525 |
| 49 | 516 |
| 50 | 512 |
| 51 | 505 |
| 52 | 500 |
| 53 | 494 |
| 54 | 489 |
| 55 | 478 |
| 56 | 471 |
| 57 | 465 |
| 58 | 459 |
| 59 | 453 |
| 60 | 452 |
| 61 | 449 |
| 62 | 444 |
| 63 | 441 |
| 64 | 435 |
| 65 | 432 |
| 66 | 430 |
| 67 | 425 |
| 68 | 422 |
| 69 | 419 |
| 70 | 415 |
| 71 | 410 |
| 72 | 410 |
| 73 | 406 |

TABLE III-continued

| ADDRESS | DATA |
|---------|------|
| 74 | 403 |
| 75 | 400 |
| 76 | 397 |
| 77 | 390 |
| 78 | 386 |
| 79 | 382 |
| 80 | 379 |
| 81 | 376 |
| 82 | 373 |
| 83 | 370 |
| 84 | 367 |
| 85 | 363 |
| 86 | 363 |
| 87 | 361 |
| 88 | 359 |
| 89 | 357 |
| 90 | 355 |
| 91 | 353 |
| 92 | 351 |
| 93 | 348 |
| 94 | 347 |
| 95 | 344 |
| 96 | 342 |
| 97 | 340 |
| 98 | 338 |
| 99 | 337 |
| 100 | 335 |
| 101 | 331 |
| 102 | 328 |
| 103 | 326 |
| 104 | 326 |
| 105 | 325 |
| 106 | 323 |
| 107 | 321 |
| 108 | 319 |
| 109 | 318 |
| 110 | 316 |
| 111 | 314 |
| 112 | 312 |
| 113 | 311 |
| 114 | 309 |
| 115 | 308 |
| 116 | 306 |
| 117 | 305 |
| 118 | 304 |
| 119 | 303 |
| 120 | 301 |
| 121 | 229 |
| 122 | 298 |
| 123 | 297 |
| 124 | 295 |
| 126 | 293 |
| 127 | 291 |
| 128 | 290 |
| 129 | 289 |
| 130 | 287 |
| 131 | 287 |
| 132 | 285 |
| 133 | 284 |
| 134 | 283 |
| 135 | 282 |
| 136 | 280 |
| 137 | 279 |
| 138 | 278 |
| 139 | 277 |
| 140 | 275 |
| 141 | 275 |
| 142 | 274 |
| 143 | 272 |
| 144 | 271 |
| 145 | 270 |
| 146 | 270 |
| 147 | 269 |
| 148 | 268 |
| 149 | 267 |
| 150 | 266 |
| 151 | 265 |
| 152 | 264 |
| 153 | 263 |
| 154 | 262 |
| 155 | 261 |
| 156 | 260 |
| 157 | 259 |
| 158 | 257 |
| 159 | 257 |
| 160 | 257 |
| 161 | 256 |
| 162 | 254 |
| 163 | 254 |
| 164 | 253 |
| 165 | 252 |
| 166 | 252 |
| 167 | 250 |
| 168 | 249 |
| 169 | 249 |
| 170 | 248 |
| 171 | 247 |
| 172 | 246 |
| 173 | 246 |
| 174 | 245 |
| 175 | 244 |
| 176 | 243 |
| 177 | 243 |
| 178 | 242 |
| 179 | 241 |
| 180 | 240 |
| 181 | 240 |
| 182 | 240 |
| 183 | 239 |
| 184 | 238 |
| 185 | 237 |
| 186 | 237 |
| 187 | 236 |
| 188 | 235 |
| 189 | 235 |
| 190 | 234 |
| 191 | 234 |
| 192 | 233 |
| 193 | 233 |
| 194 | 232 |
| 195 | 232 |
| 196 | 230 |
| 197 | 230 |
| 198 | 229 |
| 199 | 229 |
| 200 | 229 |
| 201 | 227 |
| 202 | 227 |
| 203 | 226 |
| 204 | 206 |
| 205 | 226 |
| 206 | 224 |
| 207 | 224 |
| 208 | 223 |
| 209 | 223 |
| 210 | 223 |
| 211 | 221 |
| 212 | 221 |
| 213 | 220 |
| 214 | 220 |
| 215 | 220 |
| 216 | 219 |
| 217 | 219 |
| 218 | 218 |
| 219 | 218 |
| 220 | 218 |
| 221 | 217 |
| 222 | 216 |
| 223 | 216 |
| 224 | 216 |
| 225 | 215 |
| 226 | 215 |
| 227 | 214 |
| 228 | 212 |
| 229 | 212 |
| 230 | 211 |
| 231 | 210 |
| 232 | 210 |
| 233 | 210 |
| 234 | 209 |
| 235 | 209 |
| 236 | 208 |

TABLE III-continued

| ADDRESS | DATA |
| --- | --- |
| 237 | 208 |
| 238 | 207 |
| 239 | 207 |
| 240 | 206 |
| 241 | 206 |
| 242 | 206 |
| 243 | 205 |
| 244 | 204 |
| 245 | 204 |
| 246 | 204 |
| 247 | 204 |
| 248 | 203 |
| 249 | 203 |
| 250 | 203 |
| 251 | 202 |
| 252 | 201 |
| 253 | 201 |
| 254 | 201 |
| 255 | 200 |

The multiplexer 94 may be any suitable commercially available multiplexer, such as a 74LS153, available from Fairchild. The multiplexer 94 governs the input to prediction look up table 36. When the apparatus of FIG. 4A is in its normal operation mode, the four MSB's of the address to table 36 are determined by the value in register 38 (via input channel A of multiplexer 94), as in FIG. 3. When the apparatus of FIG. 4A is in its adaptation mode, the four MSB's of the address to table 36 are determined by the value in register 88 (via input channel B of multiplexer 94).

Register 38 stores a portion, typically the four MSB's, of the value outputted by prediction look-up table 36. Upon system initialization, register 38 is loaded to the data value located at the highest address of table 36.

When the apparatus is in its learning mode, the attenuation may be set at a fixed value. This fixed value is fed to the driver of the atteunator via input channel B of analog multiplexer 96, as shown. When the apparatus is in its normal operation mode, as explained in connection with FIG. 3 hereinabove, an appropriate attenuation value is computed for each pulse and is transmitted via the D/A converter 40 and via input channel A of analog multiplexer 96, to the attenuator driver 18.

Analog multiplexer 96 may comprise any suitable commerically available element such as an MC 14053B, available from Motorola Semiconductor Products Inc., Austin, Tex., U.S.A.

In this embodiment, the beam splitter is typically only operative when the apparatus is in its learning mode. When the apparatus is in its learning mode, the energy of the sampled beam will be the same as the energy of the unattenuated beam, but multiplied by a constant due to the attenuation. The constant may be taken into account by any of the following methods, separately or in combination: (1) providing a beam splitter 62 with a compensatory index of refraction; (b) suitably altering the amplification of integrator 80; (c) suitably altering the reference voltage supplied to A/D converter 86; (d) multiplying the data value of each address of the inverse attenuator look up table by a constant.

It is also possible to utilize the structure of FIGS. 4A and 4B to "learn" the actual transfer function of the acousto-optic attenuator. The term "transfer function" refers to the proportion of the laser beam transferred as a function of the control voltage applied to the A/O driver. In this way, the inverse attenuator table can be constructed based on the real behavior of the A/O attenuator and driver.

Figure 5A:
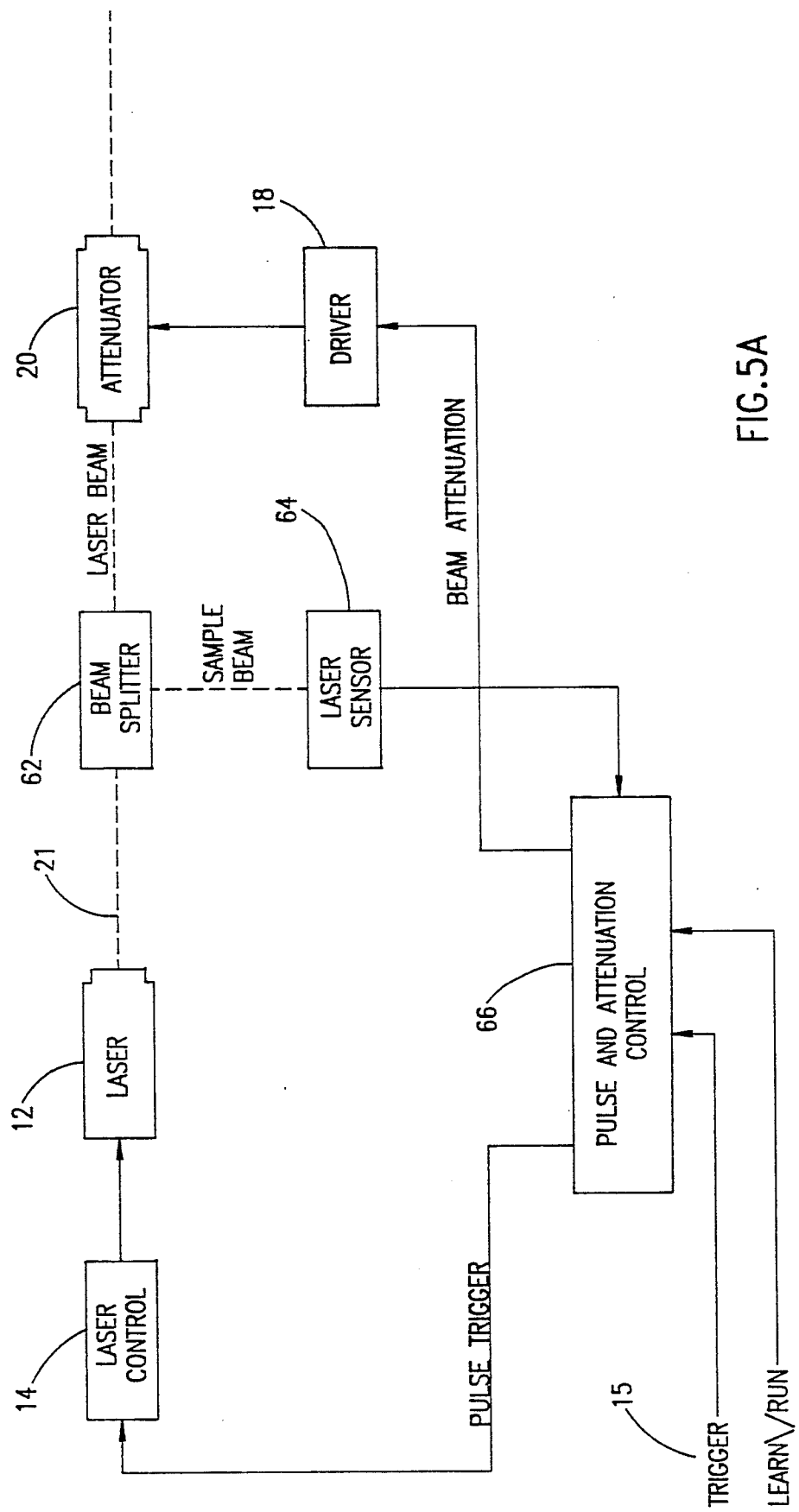
FIG. 5A is a block diagram illustration of an alternative implementation of a pulsed laser stabilization apparatus which includes an energy sensor for the learning of the laser response, in which the laser sensor is located before the A/O attenuator along the laser beam path.
Figure 5B:
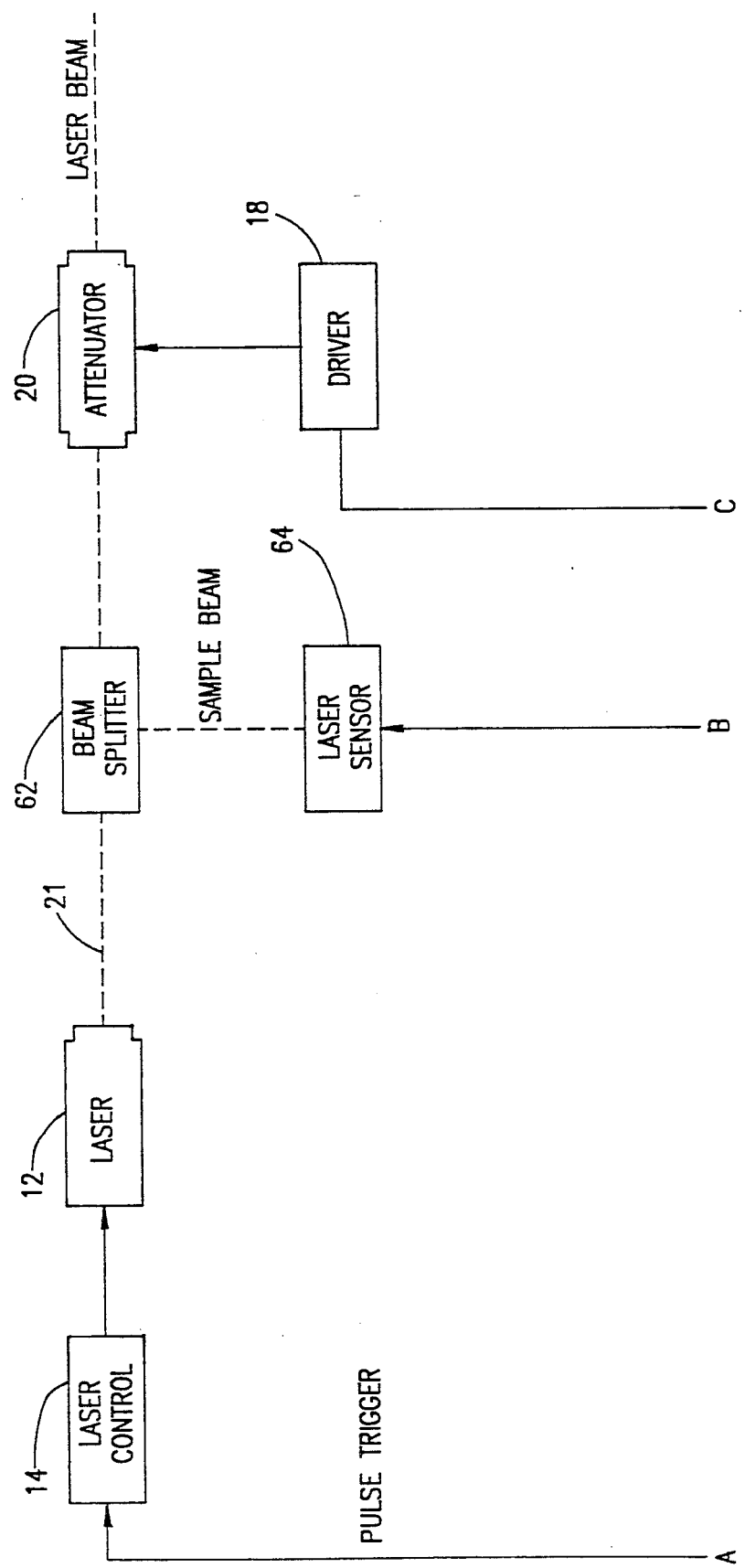
FIG. 5B is a detailed block diagram of the pparatus of FIG. 5A.
Figure 5B:
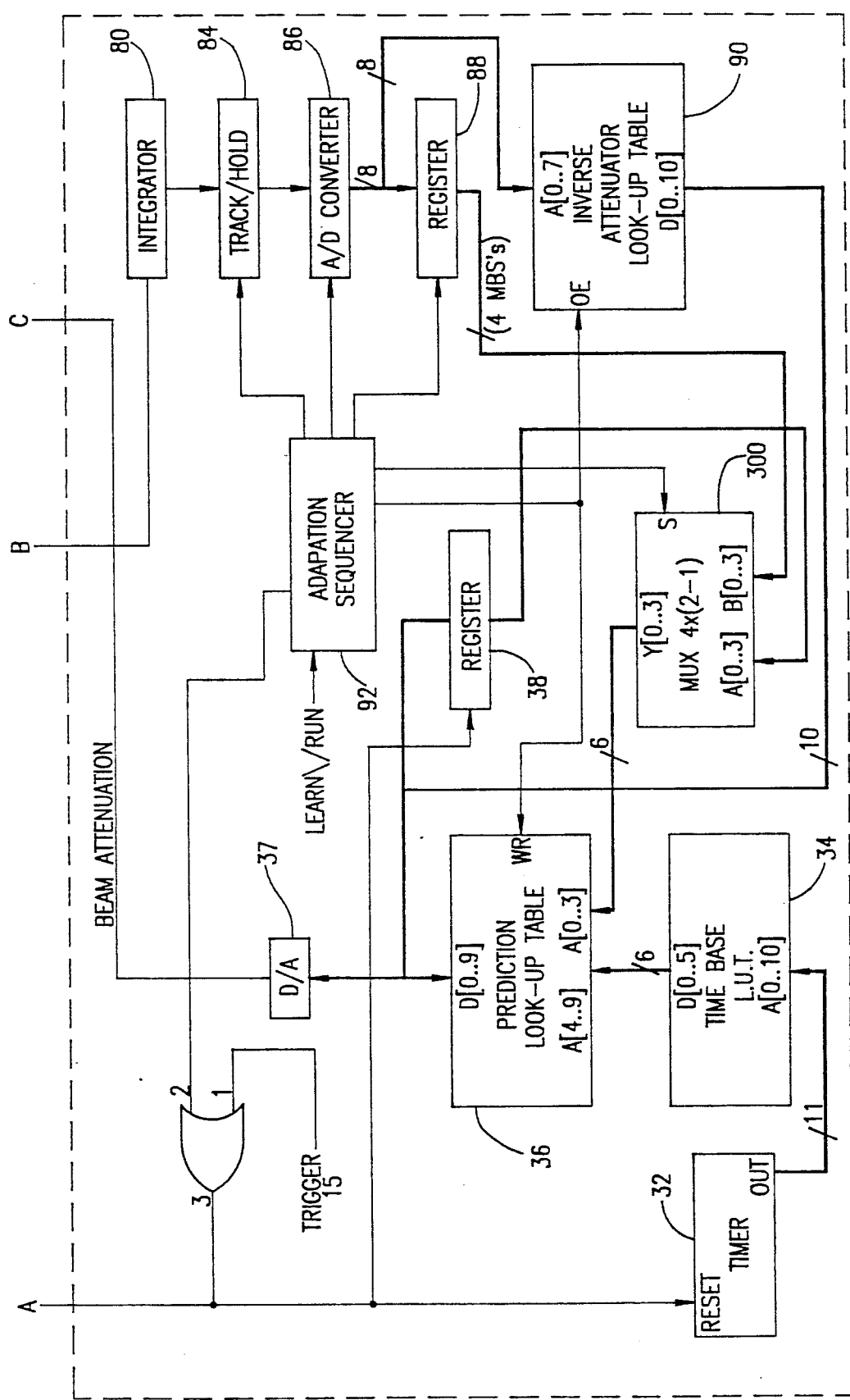

A further preferred embodiment of the present invention is shown in FIGS. 5A and 5B, which show a structure similar to the structure of FIGS. 4A and 4B, except that the beam splitter is located between the acousto-optic attenuator 20 and the laser 12. Since the beam is sampled prior to its attenuation, analog multiplexer 96 need not be provided.

It will be appreciated that alternative embodiments of the present invention may utilize software, rather than hardware, for implementing at least the various tables and the sequencer 92, using a suitable computer such as the AD 2100 DSP microcontroller available from Analog Devices, Norwood, MA, U.S.A., or the TMS 320 C10 available from Texas Instruments, Houston, Tex., U.S.A.

Figure 6:
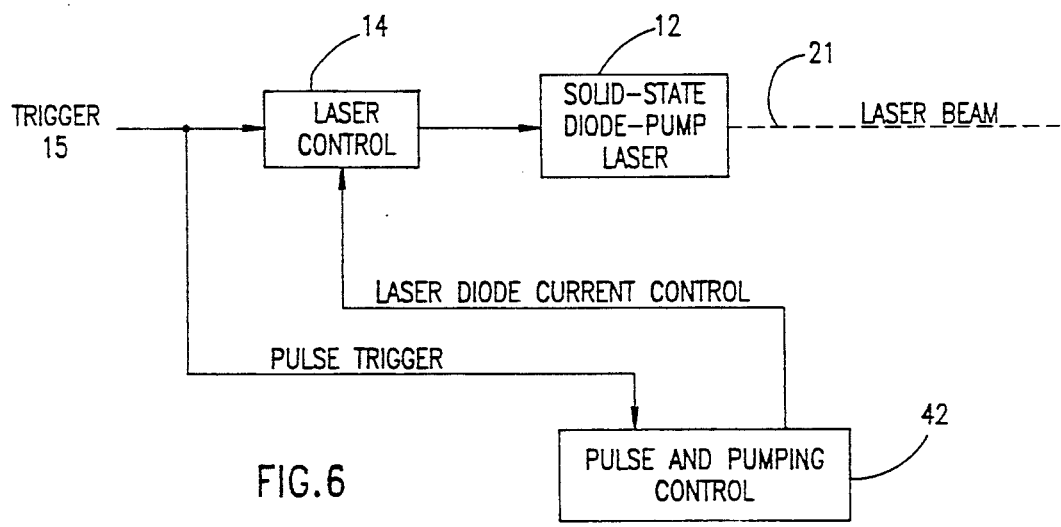
FIG. 6 is a block diagram illustration of pulsed laser stabilization apparatus constructed and operative in accordance with another preferred embodiment of the present invention.

Reference is made now to FIG. 6 which illustrates a simplified block diagram of an alternative method and apparatus for controlling the laser power differing from the previous method in that the pulse energy is stabilized by dynamically controlling the laser pumping power rather than by directly attenuating the laser beam. This system includes pulse and pumping control apparatus 42 (shown in FIG. 9), which, in response to triggers received from the laser pulse trigger 15, adjusts the laser diode pumping current in laser 12 by supplying suitable data to control apparatus 14, in accordance with a schedule such as that shown in the timing diagram of FIGS. 7A-7C.

Figure 7A:
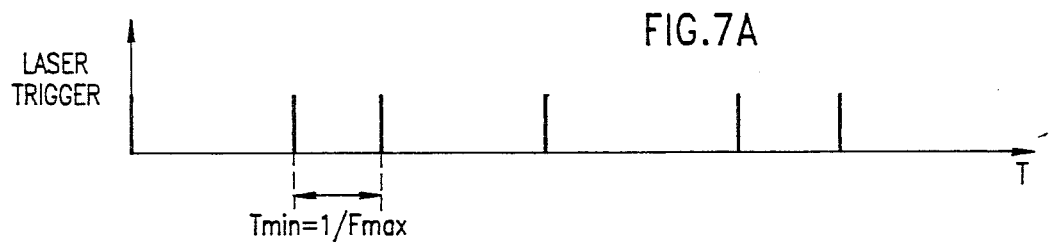
FIGS. 7A-7C are illustrations of pulse timing realized using the apparatus of FIG. 6.
Figure 7B:
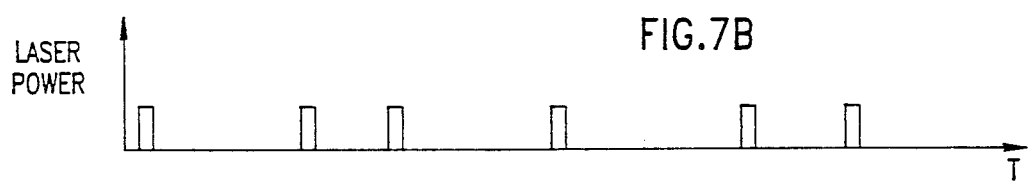
Figure 7C:
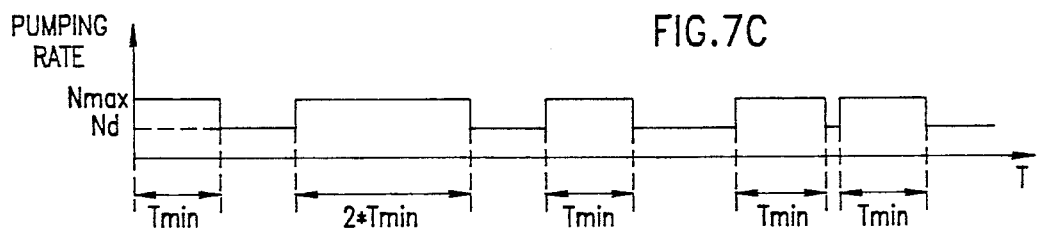

As shown in FIGS. 7A-7C, immediately following each laser trigger (FIG. 7A), the pumping current (FIG. 7C) is set at a first, high rate. After a pre-determined time period T which does not exceed and is preferably equal to the minimum time interval between successive pulse triggers in a particular application, the current is typically decreased to a second, relatively low rate which is just sufficient to compensate for the spontaneous decay in the laser rod, thereby to maintain generally constant population inversion until the next incoming pulse trigger, thereby generally maintaining the pulse energy at the desired constant level (FIG. 7B).

It is appreciated that a number of pumping rates, rather than only two pumping rates as in the present example, may be used, if desired. Furthermore, one of the two or more pumping rates may be a rate of zero, or no pumping.

Figure 8:
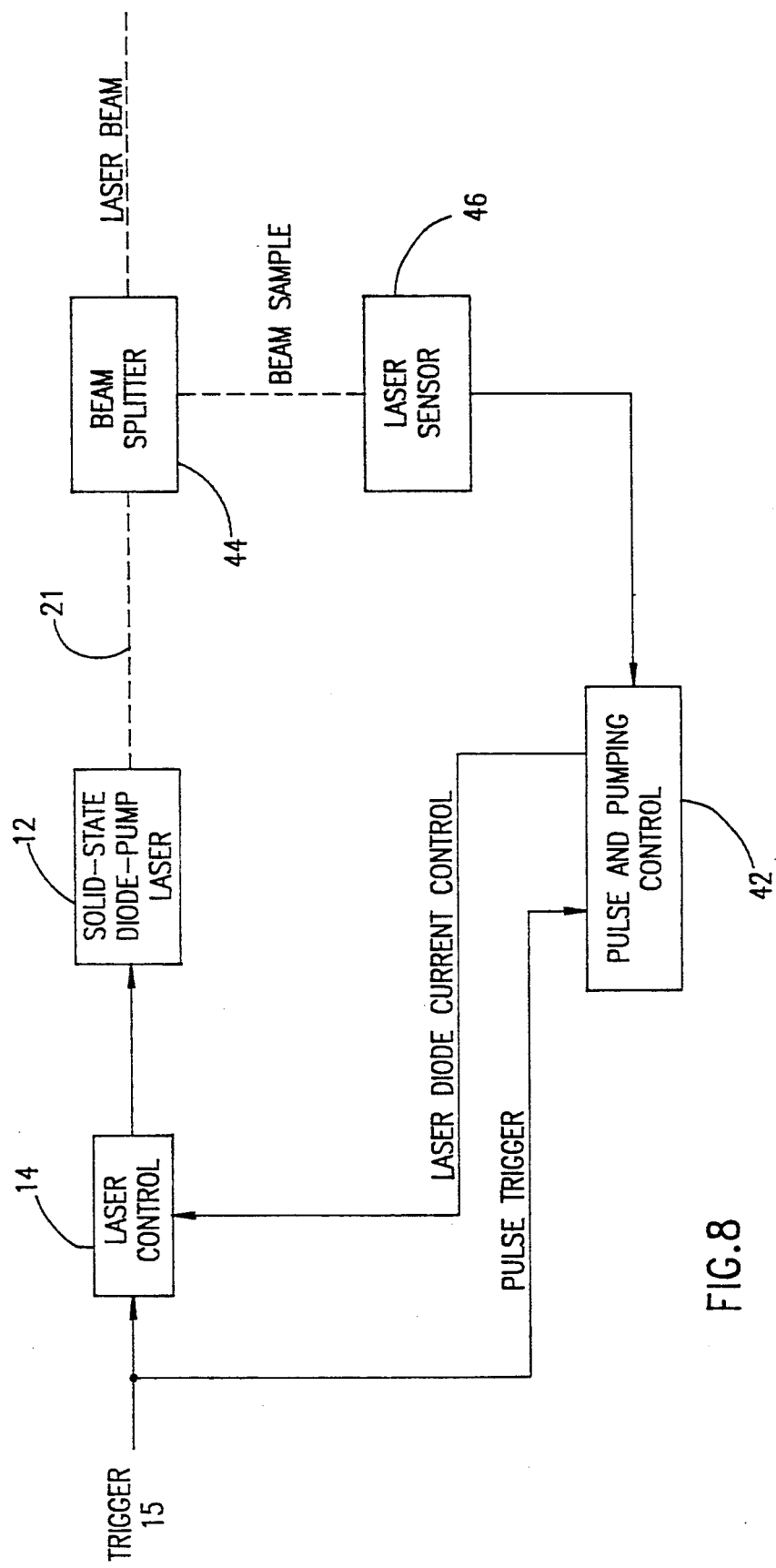
FIG. 8 is an improvement of FIG. 6 which includes a laser energy meter for the adaptation of the pumping control parameters.

Reference is now made to the structure of FIG. 8 which resembles the structure of FIG. 6 but further comprises a laser beam splitter 44 lying along the output path of the laser beam which directs a beam sample to a photo-electric sensor 46, such as a PIN diode. Beam splitter 44 in conjunction with sensor 46 are operative to measure the laser pulse intensity, thereby to enable calibration of the pumping current to the laser diode based on the real parameters of the system, rather than on theoretically predicted parameters.

Figure 9:
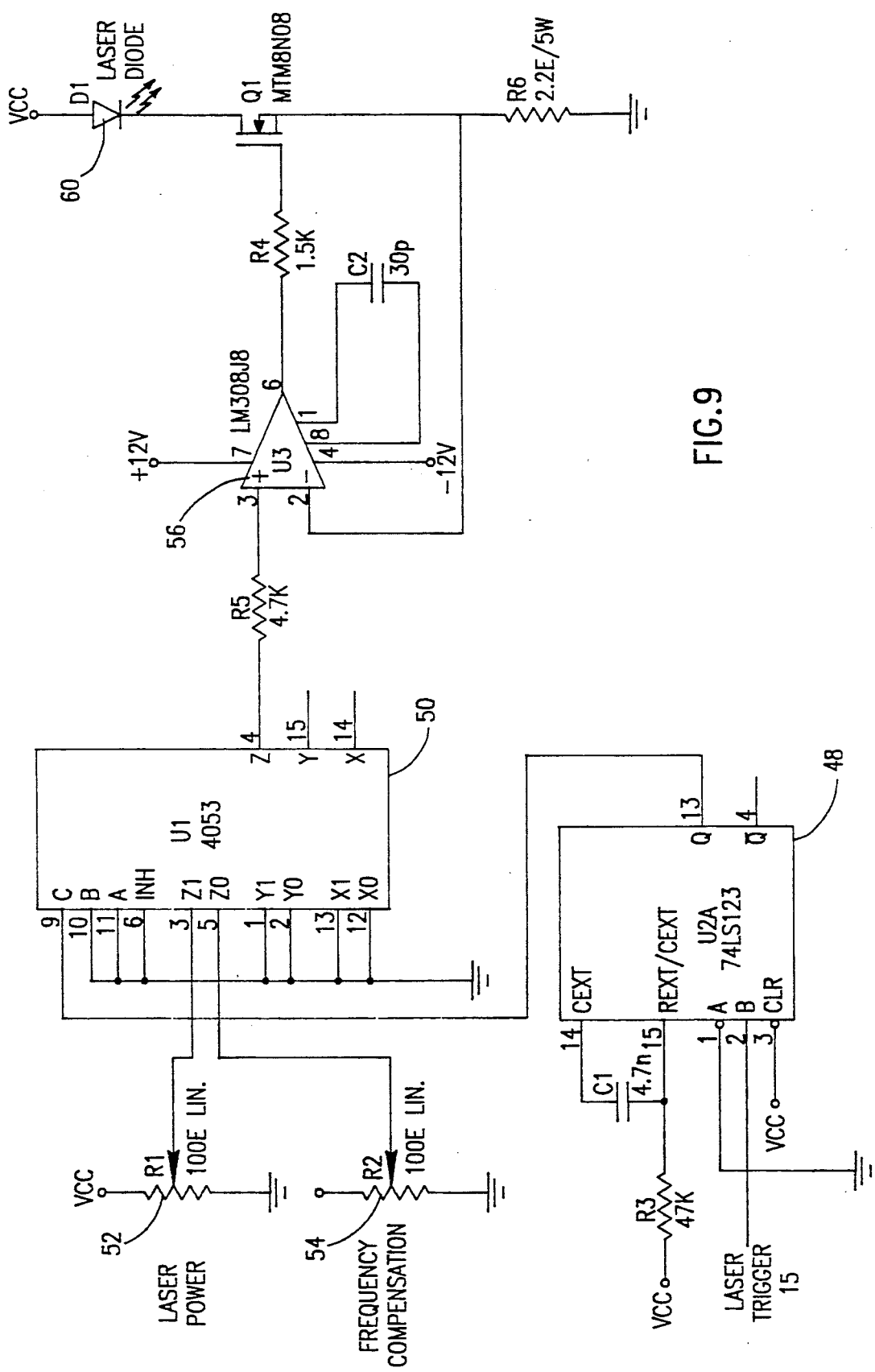
FIG. 9 is a detailed block diagram illustration of the pulse and punping control apparatus of FIG. 6.

Reference is made now to FIG. 9 which illustrates an implementation of the pumping control circuit 42 of FIGS. 6 and 8. A monostable 48, such as a 74LS123 available from Fairchild Semiconductor, controls an analog switch 50, such as a MC 14053B available from Motorola Semiconductor Products Inc., which switches between two selectable voltage levels provided by the taps of resistors 52 and 54, respectively. An amplifier 56, such as an LM308J8 available from National Semiconductor Corp., and a transistor 58, such as a MTM8N08, available from Motorola, convert the voltage output by analog switch 50 to a proportional current which is supplied to a laser diode 60.

The laser may be a Q-switched laser, such as a solid-state pumped laser, and is preferably pumped by a solid-state laser diode. The solid state pumped laser may, for example, be a Nd:YLF or an ND:YAG.

It is appreciated that the term "energy of the pulse" has been used in a broad sense herein and is intended to encompass one or more of various energy related characteristics of a pulse such as the pulse energy content, the pulse peak power, pulse average power, pulse intensity, pulse peak intensity. Although in the embodiments shown and described herein, the pulse characteristic to be stabilized was the energy of the pulse, it is appreciated that proper design of the laser sensor will allow others of the energy related characteristics listed herein to be selected to be stabilized.

It will be appreciated by persons skilled in the art that the present invention is not limited to what has been particularly shown and described hereinabove. Rather the scope of the present invention is defined only by the claims which follow:

We claim:

1. Stabilized pulsed laser apparatus comprising:
    pulsed laser means providing an output beam comprising a plurality of pulses and having at least one energy characteristic comprising at least one of the following characteristics: pulse energy content, pulse peak power, pulse average power, pulse intensity and pulse peak intensity;
    a pulse controller providing control instructions to the laser; and
    an attenuator for selectably performing attenuation of the output beam of the pulsed laser means in response to at least the time interval between a given pulse and the pulse preceding it, for maintaining said at least one desired energy characteristic notwithstanding changes in at least the time interval.

2. Apparatus according to claim 1 and also comprising means for computation of said attenuation according to the time interval between a present pulse and each of a plurality of previous pulses.

3. Apparatus according to claim 1 and also comprising timing means for sensing the time interval between subsequent pulses and providing an indication thereof to said generating means.

4. Apparatus according to claim 1 and wherein said attenuator comprises an acousto-optic attenuator.

5. A technique for operation of pulsed laser apparatus, said laser apparatus having at least one energy characteristic comprising at least one of the following characteristics: pulse energy content, pulse peak power, pulse average power, pulse intensity and pulse peak intensity and defining a population inversion build up time, said technique including the steps of:
    operating the pulsed laser apparatus to provide an output beam comprising a plurality of output pulses having nonequal time intervals therebetween, at least some of said nonequal time intervals being less than said population inversion build up time; and
    attenuating the output beam of the pulsed laser apparatus in response to at least the elapsed time interval between a given pulse and the pulse preceding it, for maintaining said at least one energy characteristic notwithstanding changes in said elapsed time interval.

6. A technique according to claim 5 and also comprising, prior to said step of attenuating, the step of computing said attenuation according to the time interval between a present pulse and each of a plurality of previous pulses.

7. Stabilized pulsed laser apparatus comprising:
    pulsed laser means providing an output beam comprising plurality of pulses having at least one energy characteristic comprising at least one of the following characteristics: pulse energy content, pulse peak power, pulse average power, pulse intensity and pulse peak intensity;
    a pulse controller providing control instructions to the pulsed laser means;
    an attenuator for selectably attenuating the output beam of the pulsed laser means in response to attenuation control signals; and
    generating means for generating attenuation control signals in response to an indication of said at least one energy characteristic of the preceding pulse and to the time interval between a given pulse and the pulse preceding it, for maintaining at least one desired energy characteristic notwithstanding changes in the time interval.

8. Apparatus according to claim 7 and also comprising:
    sampling means for sampling the output beam, for sensing said at least one energy characteristic thereof, and for providing an indication of the at least one energy characteristic thereof to the generating means.

9. Apparatus according to claim 8 and wherein said sampling means comprises:
    a beam splitter; and
    energy characteristic sensing means.

10. Apparatus according to claim 7 and wherein said generating means comprises a look-up table based on empirically derived data providing an indication of an energy characteristic of a present pulse based on at least the time interval between the present pulse and the pulse preceding it.

11. Apparatus according to claim 10 and wherein the indication of the energy characteristic is also based on an energy characteristic of the preceding pulse.

12. Apparatus according to claim 9 and wherein said energy characteristic sensing means comprises a photodetector.

13. Apparatus according to claim 9 and wherein said beam splitter is located along the path of the output beam between the laser and the attenuator.

14. Apparatus according to claim 9 and wherein said attenuator is located along the path of the output beam between the laser and the beam splitter.

15. A technique for calibration of pulsed laser stabilizing apparatus defining a population inversion build-up time, said technique including the steps of:
    operating the pulsed laser to provide a plurality of output pulses having non-equal time intervals therebetween, at least some of said non-equal time intervals being less than said population inversion build up time;
    generating a look-up table based on empirically derived data, said look up table providing an indication of an energy characteristic of a present pulse based on the time interval between the present pulse and the pulse preceding it and on the basis of an energy characteristic of the preceding pulse; and
    utilizing said look-up table for calibration of pulsed laser stabilizing apparatus.

16. A technique according to claim 15 and wherein said step of operating comprises the step of operating the pulsed laser to provide a relatively large number of equally spaced pulses.

17. A method of producing pulsed non-periodic coherent energy outputs comprising the steps of:
providing a Q-switched laser having at least two selectable pumping rates; and
providing a uniform degree of population inversion for each pulse, irrespective of the time interval separating it from the preceding pulse.

18. A method according to claim 17 and wherein said providing step includes the step of setting the degree of population inversion to be equal to that realized for pulses produced at the minimum possible interval between successive pulses.

19. A method according to claim 17 and wherein said providing step includes the step of receiving indications of the triggering of each pulse and selecting a one of said at least two pumping rates upon receipt of each of said indications.

20. A method according to claim 19 and wherein said selecting step includes the step of providing maximum rate pumping for a time duration equal to the minimum duration between adjacent pulses.

21. A method according to claim 20 and wherein the step of providing maximum rate pumping begins immediately after each pulse.

22. A method according to claim 20 and wherein the step of providing maximum rate pumping begins a predetermined length of time before the pulse.

23. A method according to claim 17 and wherein the governing step includes the step of providing continuous pumping at a low rate to compensate for natural decay.

24. A method according to claim 22 and wherein said step of providing continuous pumping takes place when the rate of pumping is less than the maximum rate of pumping.

25. A method according to claim 17 and wherein one of said at least two selectable pumping rates is the zero pumping rate.

26. Apparatus for producing pulsed non-periodic coherent energy outputs comprising:
a Q-switched laser having at least two selectable pumping rates; and
means for providing a uniform degree of population inversion for each pulse, irrespective of the time interval separating it from the preceding pulse.

27. Apparatus according to claim 26 and wherein said Q-switched laser comprises a solid state pumped laser.

28. Apparatus according to claim 27 and wherein the solid state pumped laser is an Nd:YLF.

29. Apparatus according to claim 27 and wherein the solid state pumped laser is an Nd:YAG.

30. Apparatus according to claim 27 and wherein said solid state pumped laser is pumped by a solid state laser diode.

* * * * *